United States Patent
Stoltz

(10) Patent No.: US 7,464,429 B2
(45) Date of Patent: Dec. 16, 2008

(54) AUTOMATIC POOL CLEANER GEAR CHANGE MECHANISM

(75) Inventor: Herman Stoltz, Pretoria (ZA)

(73) Assignee: Pentair Water Pool and Spa, Inc., Sanford, NC (US)

( * ) Notice: Subject to any disclaimer, the term of this patent is extended or adjusted under 35 U.S.C. 154(b) by 618 days.

(21) Appl. No.: 10/482,747

(22) PCT Filed: Jun. 27, 2002

(86) PCT No.: PCT/ZA02/00106

§ 371 (c)(1),
(2), (4) Date: Jun. 16, 2004

(87) PCT Pub. No.: WO03/004799

PCT Pub. Date: Jan. 16, 2003

(65) Prior Publication Data

US 2004/0231075 A1 Nov. 25, 2004

(30) Foreign Application Priority Data

Jul. 3, 2001 (ZA) .................................. 2001/0046
Feb. 28, 2002 (ZA) .................................. 2002/1669

(51) Int. Cl.
*E04H 4/16* (2006.01)
(52) U.S. Cl. ........................... 15/1.7; 74/417; 180/6.66; 180/7.1; 180/9.62; 180/9.64
(58) Field of Classification Search .................... 15/1.7; 74/417; 180/6.66, 7.1, 9.62, 9.64
See application file for complete search history.

(56) References Cited

U.S. PATENT DOCUMENTS

| | | | | |
|---|---|---|---|---|
| 2,311,393 A | * | 2/1943 | Honeywell | ................. 180/6.66 |
| 2,923,954 A | | 2/1960 | Babcock | |
| 2,988,762 A | | 6/1961 | Babcock | |
| 3,035,451 A | * | 5/1962 | O'Connell et al. | ............ 74/133 |
| 3,337,889 A | * | 8/1967 | West | ............................ 15/1.7 |
| 3,439,368 A | | 4/1969 | Myers | |

(Continued)

FOREIGN PATENT DOCUMENTS

EP     0 565 226 A1     10/1993

(Continued)

OTHER PUBLICATIONS

US 5,885,130, 03/1999, Kuralt et al. (withdrawn)

*Primary Examiner*—Mark Spisich
(74) *Attorney, Agent, or Firm*—Greenberg Traurig, LLP

(57) ABSTRACT

A mechanism (106) for selecting one of a first gear (102) and a second gear (104) for driving an automatic swimming pool cleaner (10) includes a bi-stable oscillating gear change assembly (100). The assembly is moveable between a first position wherein the first gear is engaged and a second position wherein the second gear is engaged. A first magnet (142) is carried by the assembly. A second magnet (138, 140) is carried externally of the assembly on the cleaner body (18). A cam arrangement (152, 160) initiates movement of the assembly (100) from one of the first and second positions to enable mutually repelling forces between like poles of the first and second magnets (142, 138, 140) to cause the assembly to settle in another of the first position and the second positions, thereby to change between the first and second gears quickly and cleanly.

14 Claims, 21 Drawing Sheets

U.S. PATENT DOCUMENTS

| | | | |
|---|---|---|---|
| 3,551,930 A | 1/1971 | Myers | |
| 4,449,265 A | 5/1984 | Hoy | |
| 4,483,407 A | 11/1984 | Iwamoto et al. | |
| 4,521,933 A | 6/1985 | Raubenheimer | |
| 4,536,908 A | 8/1985 | Raubenheimer | |
| 4,656,683 A | 4/1987 | Raubenheimer | |
| 4,722,110 A | 2/1988 | Chandler | |
| 4,749,478 A | 6/1988 | Brooks | |
| 4,920,599 A | 5/1990 | Rief | |
| 4,932,831 A | 6/1990 | White | |
| 5,001,800 A | 3/1991 | Parenti et al. | |
| 5,022,812 A | 6/1991 | Coughlan et al. | |
| 5,097,559 A | 3/1992 | Brunt et al. | |
| 5,099,535 A | 3/1992 | Chauvier et al. | |
| 5,105,496 A | 4/1992 | Gray, Jr. et al. | |
| 5,172,445 A | 12/1992 | Chandler | |
| 5,197,158 A | 3/1993 | Moini | |
| 5,256,207 A | 10/1993 | Sommer | |
| 5,337,434 A | 8/1994 | Elrich | |
| 5,412,826 A | 5/1995 | Raubenheimer | |
| 5,435,031 A | 7/1995 | Minami et al. | |
| 5,443,354 A | 8/1995 | Stone et al. | |
| 5,507,058 A | 4/1996 | Minami et al. | |
| 5,539,947 A | 7/1996 | Kiraly | |
| 5,542,141 A | 8/1996 | Albright | |
| 5,617,600 A | 4/1997 | Frattini | |
| 5,720,068 A | 2/1998 | Clark et al. | |
| 5,771,987 A | 6/1998 | Marbach | |
| 5,893,188 A | 4/1999 | Campbell et al. | |
| 5,896,610 A * | 4/1999 | Sebor et al. | 15/1.7 |
| 5,933,899 A | 8/1999 | Campbell et al. | |
| 5,976,385 A | 11/1999 | King | |
| 6,003,184 A | 12/1999 | Campbell et al. | |
| 6,039,886 A | 3/2000 | Henkin et al. | |
| 6,061,860 A | 5/2000 | Fitzgerald | |
| 6,094,764 A | 8/2000 | Veloskey et al. | |
| 6,115,864 A | 9/2000 | Davidsson et al. | |
| 6,131,227 A | 10/2000 | Rief et al. | |
| 6,132,287 A | 10/2000 | Kuralt et al. | |
| 6,206,547 B1 | 3/2001 | Erlich | |
| 6,212,725 B1 | 4/2001 | Porat | |
| 6,237,175 B1 | 5/2001 | Phillipson et al. | |
| 6,280,611 B1 | 8/2001 | Henkin et al. | |
| 6,292,970 B1 | 9/2001 | Rief et al. | |
| 6,358,425 B1 | 3/2002 | King | |
| 6,387,250 B1 | 5/2002 | Henkin et al. | |
| 6,412,133 B1 | 7/2002 | Erlich et al. | |
| 6,560,808 B2 | 5/2003 | Phillipson et al. | |
| 6,564,417 B2 | 5/2003 | Porat | |
| 6,581,232 B1 | 6/2003 | Chandler | |
| 6,633,150 B1 | 10/2003 | Wallach et al. | |
| 6,665,900 B2 | 12/2003 | Wichmann et al. | |
| 6,742,613 B2 | 6/2004 | Erlich et al. | |
| 6,758,226 B2 | 7/2004 | Porat | |
| 6,782,578 B1 | 8/2004 | Rief et al. | |
| 6,820,297 B2 | 11/2004 | Phillipson et al. | |
| 6,842,931 B2 | 1/2005 | Porat et al. | |
| 6,854,148 B1 | 2/2005 | Rief et al. | |
| 6,886,205 B1 | 5/2005 | Pichon | |
| 2003/0208862 A1 | 11/2003 | Henkin et al. | |
| 2004/0025269 A1 | 2/2004 | Pichon | |
| 2004/0074024 A1 | 4/2004 | Bavoso | |
| 2004/0168838 A1 | 9/2004 | Erlich et al. | |

FOREIGN PATENT DOCUMENTS

| | | |
|---|---|---|
| EP | 0 565 226 A1 | 10/1993 |
| EP | 0 657 603 A1 | 12/1993 |
| EP | 0 657 603 A1 | 6/1995 |
| EP | 0 905 334 A1 | 3/1999 |
| EP | 0 905 334 A1 | 3/1999 |
| ZA | 89/4904 | 1/1990 |

* cited by examiner

AUTOMATIC POOL CLEANER GEAR CHANGE MECHANISM

TECHNICAL FIELD

THIS invention relates to automatic cleaners for surfaces submerged in a liquid and more particularly to such cleaners which are operated by a liquid driven turbine.

Known suction and pressure operated turbine driven cleaners for a floor and walls of a swimming pool suffer from the disadvantage that when they move through a sharp corner region between the floor and a wall, traction and suction are lost which impede their ability to scale the wall. Furthermore, operation of gear change mechanisms on the known machines for causing the cleaner to change from movement in a first direction to movement in an opposite direction is, due to the complex nature of these mechanisms, not reliable enough, which results in damage to gears and even jamming and malfunctioning of the mechanisms.

OBJECT OF THE INVENTION

Accordingly it is an object of the present invention to provide an alternative cleaner and alternative mechanism for changing gears with which the applicant believes the aforementioned disadvantages may at least be alleviated.

DISCLOSURE OF THE INVENTION

According to the invention there is provided a mechanism for changing between a first gear and a second gear on an automatic swimming pool cleaner, the mechanism comprising:

- an oscillatable gear carrying assembly moveable between a first position wherein the first gear is engaged and a second position wherein the second gear is engaged;
- a biasing mechanism for urging the assembly towards a first position when selected and to the second position when selected; and
- an actuating arrangement for selecting one of said positions by initiating movement of the assembly from another of said positions, to enable the biasing mechanism to urge the assembly towards the selected one of said positions.

In some embodiments the biasing mechanism may comprise a first magnet having a pole of a first kind and a pole of a second kind which is carried by the assembly and a second magnet having a pole of the first kind and a pole of the second kind mounted externally of the assembly, with the pole of the first kind of the first magnet facing towards the pole of the first kind of the second magnet, so that mutually repelling forces between said first poles urge the assembly towards the selected one of said positions. In other embodiments the biasing mechanism may comprise springs, for example.

The first gear and the second gear may be mounted on the assembly and when the first gear is engaged, the cleaner is driven to move in a first direction and when the second gear is engaged, the cleaner is driven in another direction.

The first gear and the second gear when engaged, may drive a driven gear connected to drive an axle of a wheeled undercarriage of the cleaner.

In one embodiment the oscillatable gear carrying assembly may comprise a turbine driven shaft of the cleaner.

The shaft may comprise a formation engaging a corresponding formation on the turbine for rotatably driving the shaft and the shaft is preferably free for axial movement relative to the turbine between a first position wherein the first gear is engaged and a second position wherein the second gear is engaged.

The assembly may comprise a pivotable member pivoted to a body of the cleaner and for manipulating the shaft between the first position and the second position.

The pivotable member may be connected to cooperate with a bush which is fast with the shaft.

The bush may be mounted in a bearing for rotation with a first part of the bearing, and a second part of the bearing may be mounted on a bearing holder which may be pivotably carried by the member.

The member is preferably an elongate member and the bearing holder is preferably mounted for axial movement relative to the member.

The first magnet may be carried in a foot part of the pivotable member, the second magnet may be mounted on the body of the cleaner and a third magnet may be mounted on the body spaced from the second magnet to define a passage way for the foot part of the pivotable member.

The actuating arrangement for initiating movement may comprise a first cam cooperating with the pivotable member.

The first cam may be a turbine driven cam comprising first and second lobes and the arrangement may further comprise a passive cam comprising first and second lobes.

The first lobe of the first cam may be arranged to engage the member to move the member from the second position and the second lobe may be arranged to cooperate with the first lobe of the second cam to cause the second lobe of the second cam to move the pivotable member from the first position.

The first cam may be driven by the aforementioned turbine, alternatively by a further turbine on the cleaner.

The first gear, the second gear and the driven gear may be bevel gears.

In another embodiment the gear carrying assembly may be pivotably mounted on the body of the cleaner and the first gear may be linked to drive an axle of the wheeled undercarriage of the cleaner.

The first gear may be linked to the axle via a belt and pulley arrangement.

The gear carrying assembly may be actuated and biased to bring a selected one of the first gear and the second gear into meshing relationship with a drive gear fast with a turbine driven shaft of the cleaner.

The first gear and second gear may be mounted in meshing relationship with one another, so that when the drive gear engages the fist gear the cleaner is driven in the first direction and when the second gear is engaged, the second gear causes the first gear to drive the cleaner in the other direction.

The invention also includes within its scope a suction or pressure operated cleaner comprising a mechanism for changing between a first gear and a second gear as herein defined and/or described.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
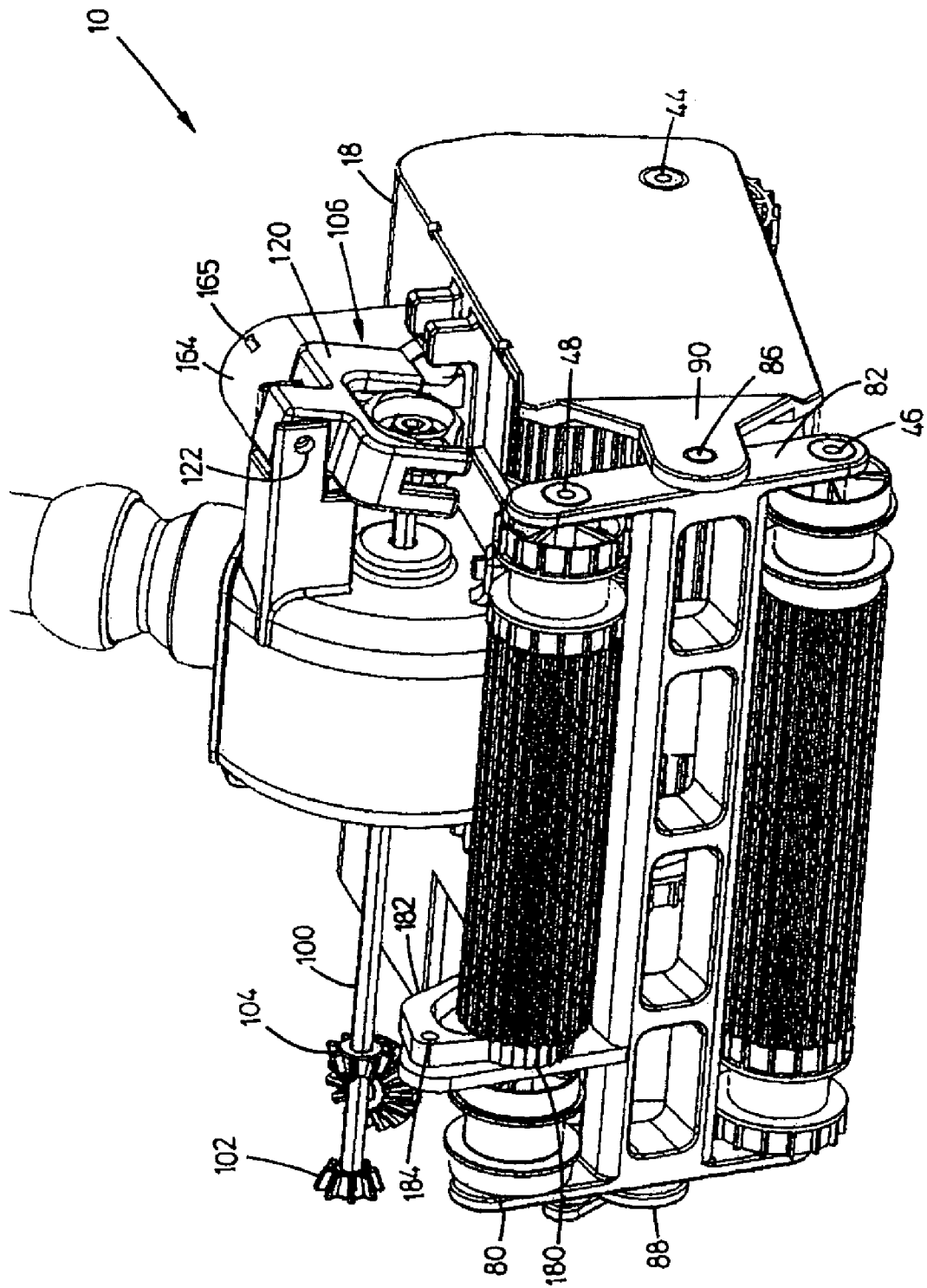
FIG. 1 is a diagrammatic isometric view of an automatic pool cleaner according to the invention from the front, one side and above.

An automatic swimming pool cleaner according to the invention is generally designated by the reference numeral 10 in the diagrams. The cleaner is a turbine driven suction cleaner which in use, is connectable in known manner via a water intake (not shown) in a pool 12 (shown in FIGS. 14 to 16) to an inlet of an electrical circulation pump (not shown) of a circulation and filtration plant (also not shown) for the swimming pool 12.

The cleaner in use moves over a floor 14 and walls 16 of the pool and under the influence of the suction generated by the pump, sucks up water entraining debris and the like which is then filtered by the filtration plant, before the water is returned into the pool via suitably positioned outlets (not shown) into the pool.

The cleaner 10 comprises a body 18 defining a liquid flow passage 20 (shown in FIG. 4) therethrough. The flow passage 20 extends between an inlet 22 into the body 18 defined in a bottom plate 24 of the body and an outlet 26 from the body. A rotatable turbine 28 for driving the cleaner is mounted in a chamber 30 in the body to extend into the passage 20, to be driven by water moving under the influence of suction from the pool towards the pump. The turbine comprises three equi-spaced curved vanes 28.1 to 28.3. When driven, the turbine rotates in one direction namely a clockwise direction only, as shown in FIG. 4.

Figure 4:
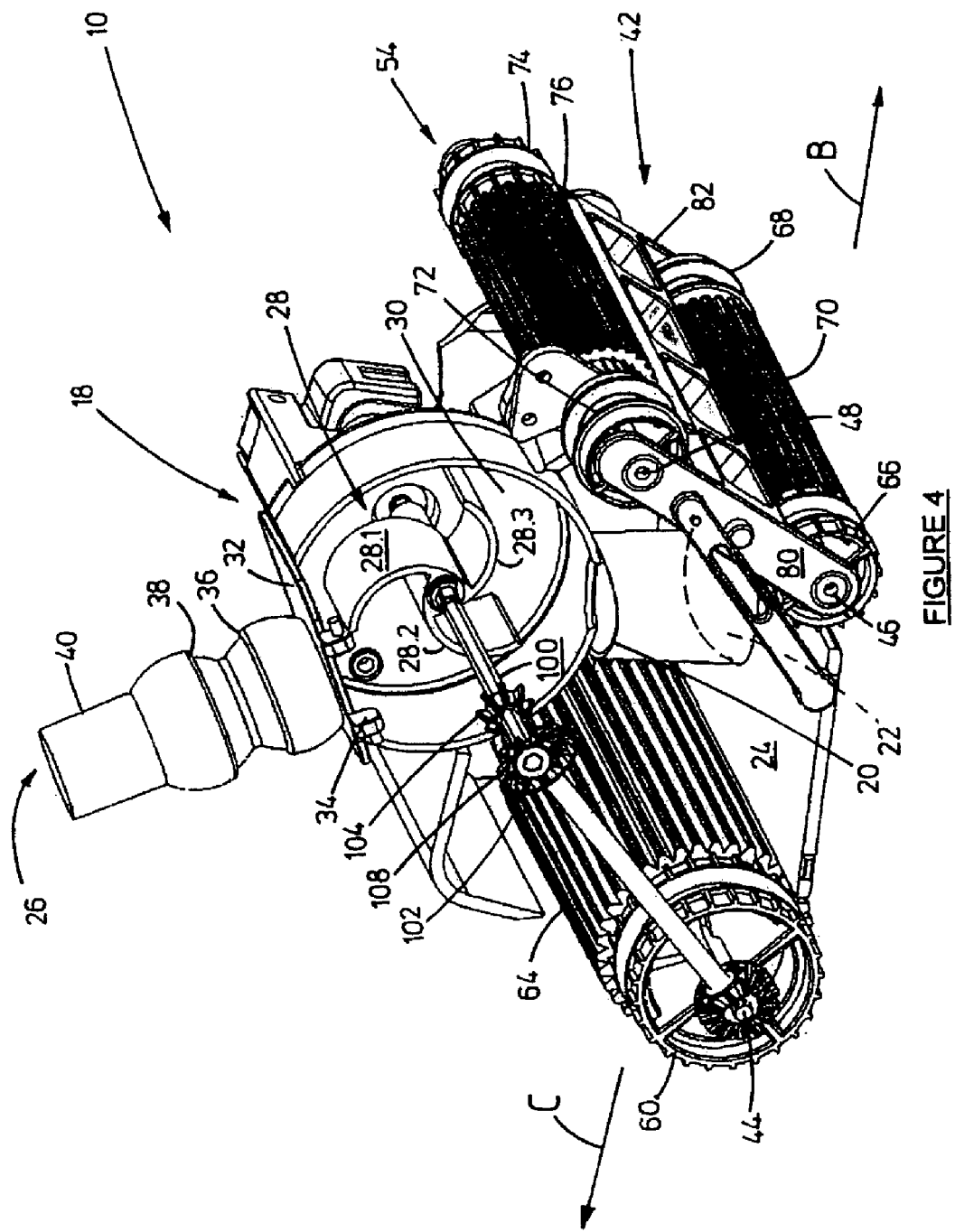
FIG. 4 is a view similar to FIG. 2 with some parts of the cleaner broken away to show a water driven turbine for driving the cleaner.
Figure 17:
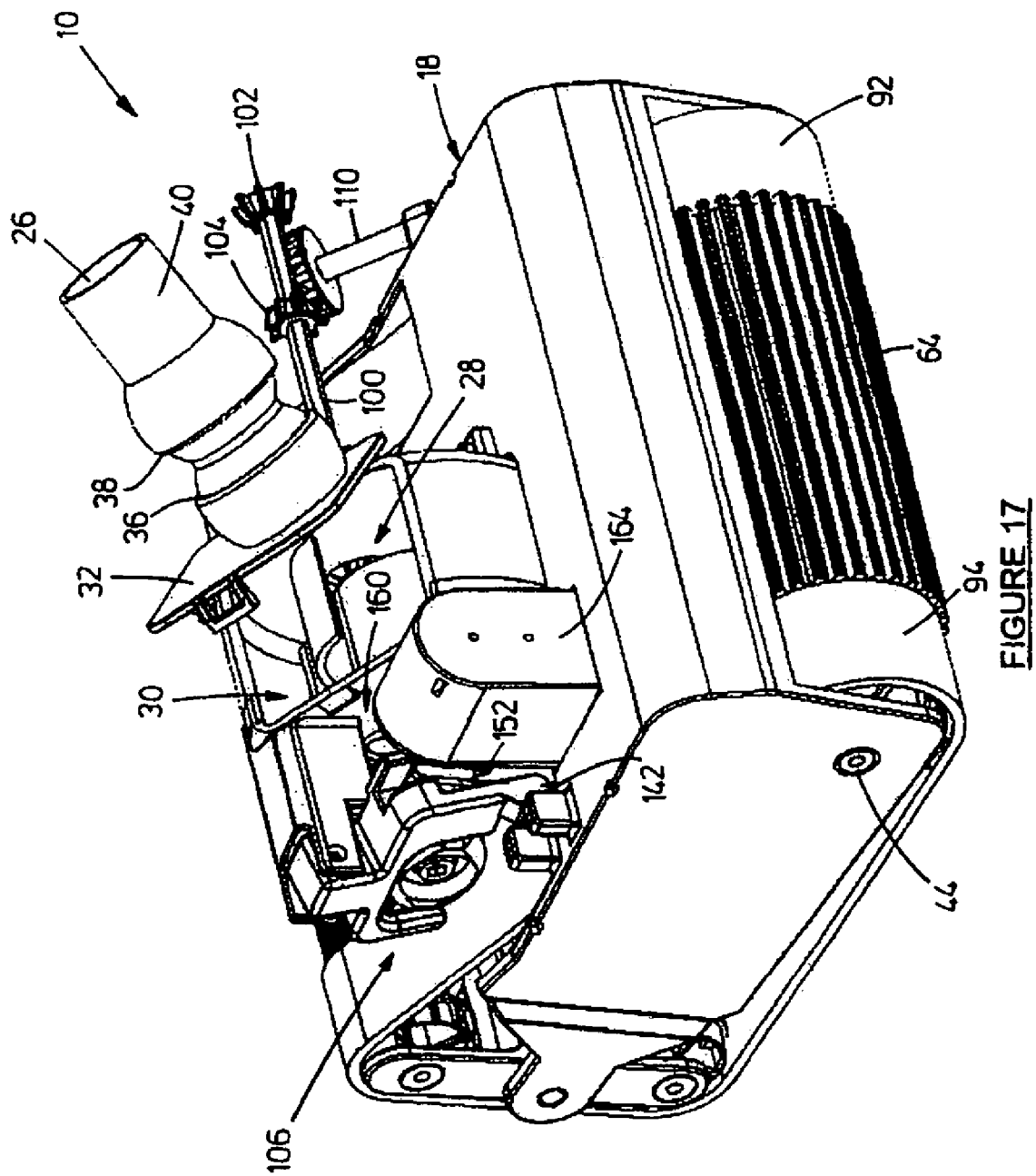
FIG. 17 is a diagrammatic isometric view of the cleaner from the rear, the one side and above, illustrating a lid on the body in an open position, to expose the turbine.

As shown in FIGS. 4 and 17, chamber 30 comprises a lid 32 which is mounted on body 18 at hinges 34, to pivot between a closed operative position shown in FIG. 4 and an open position shown in FIG. 17. When in the open position, debris or the like may be removed from chamber 30. On the lid 32 there are provided dual in line ball joints 36 and 38 to enable spigot 40 defining outlet 26 to pivot relative to the body.

In use, the spigot 40 is removably receivable in a socket defined in a conventional flexible hose (not shown) which in use is used to connect the cleaner 10 to the aforementioned intake in the pool 12, as hereinbefore described.

Figure 2:
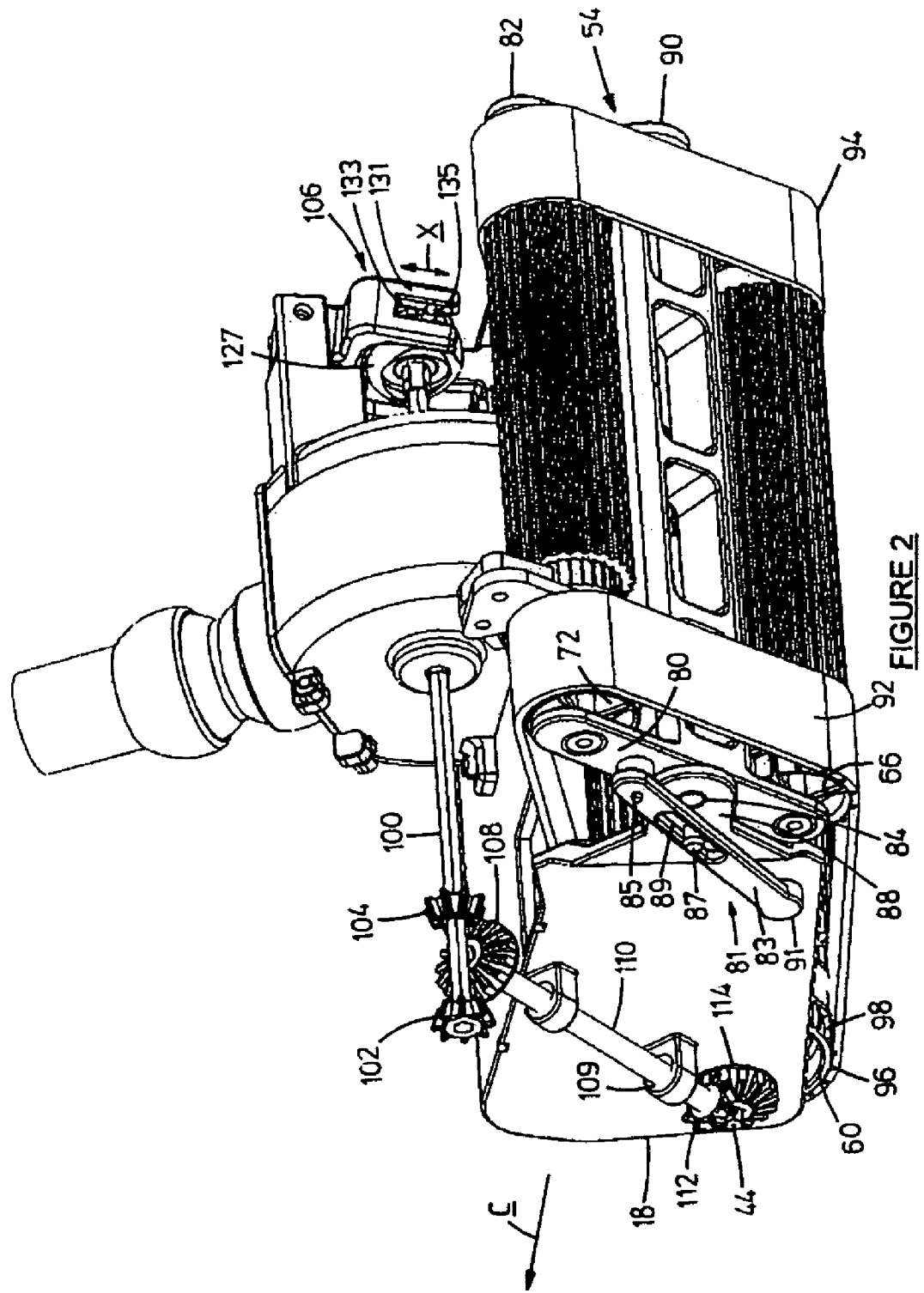
FIG. 2 is a similar view of the cleaner from the front, the other side and above.
Figure 13:
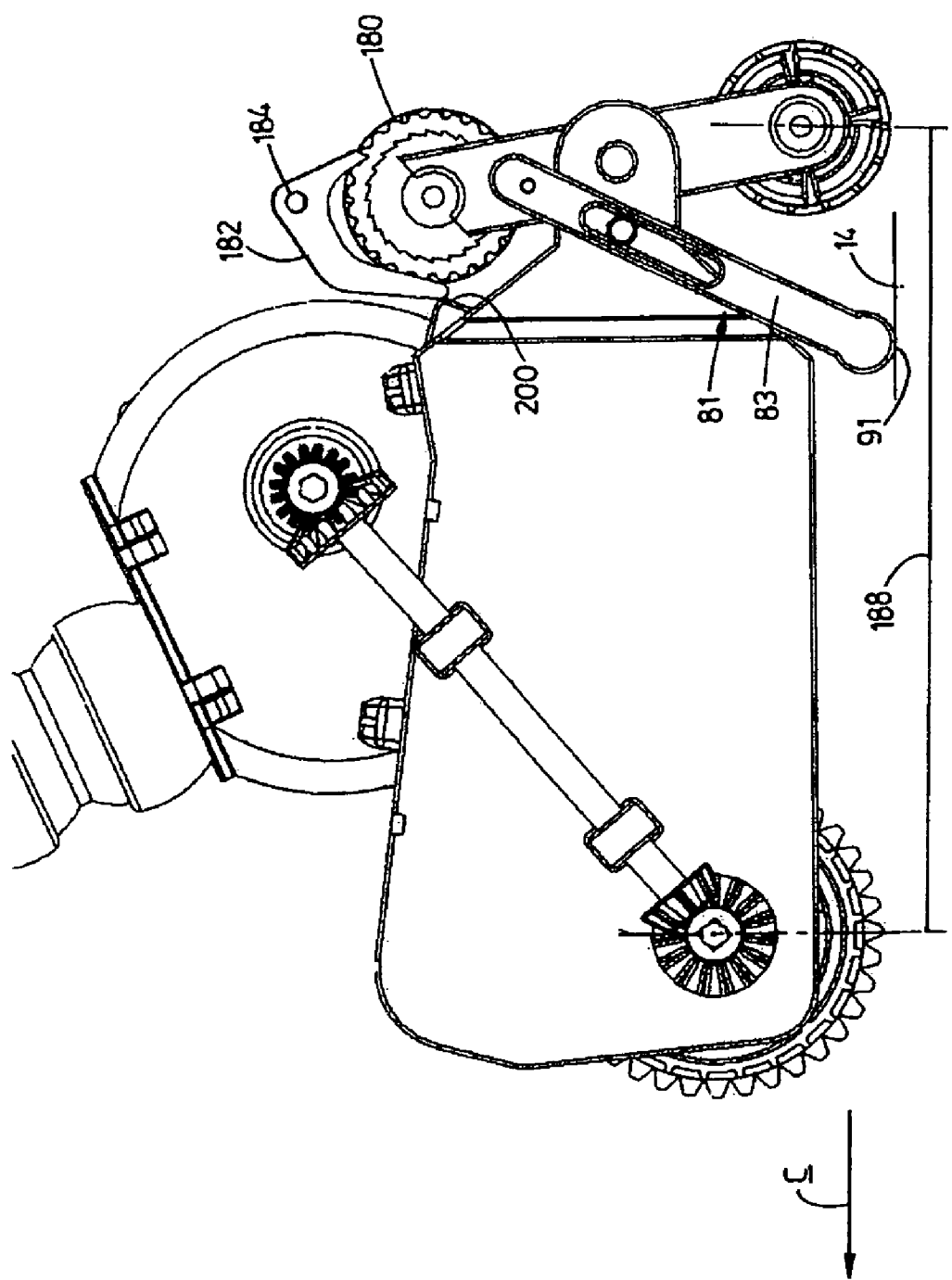
FIG. 13 is a view similar to FIG. 11 with the pivotal section in the second position.
Figure 14:
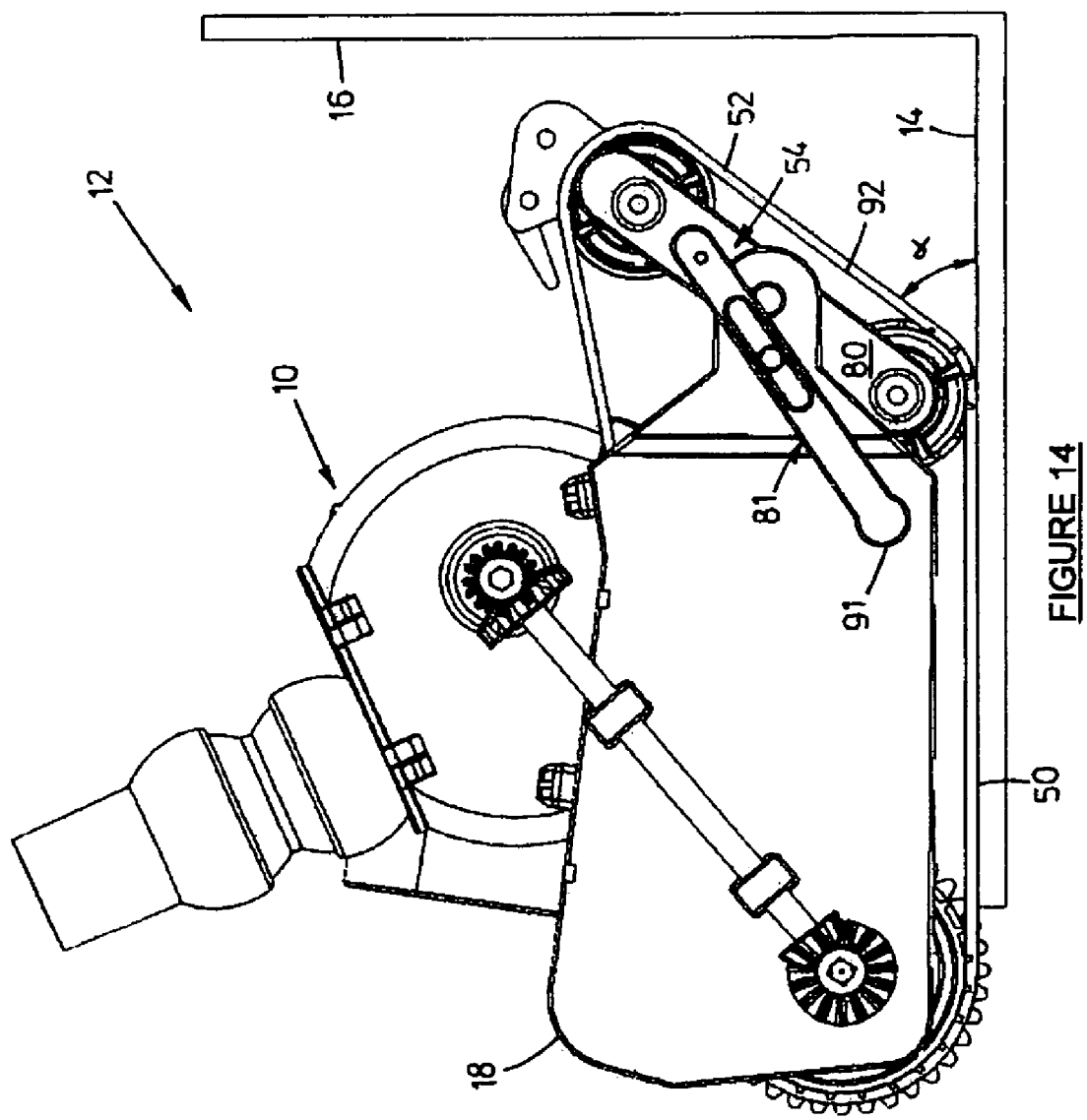
FIG. 14 is a diagrammatic side view of the cleaner approaching a corner region between a floor and a sidewall of a swimming pool.
Figure 15:
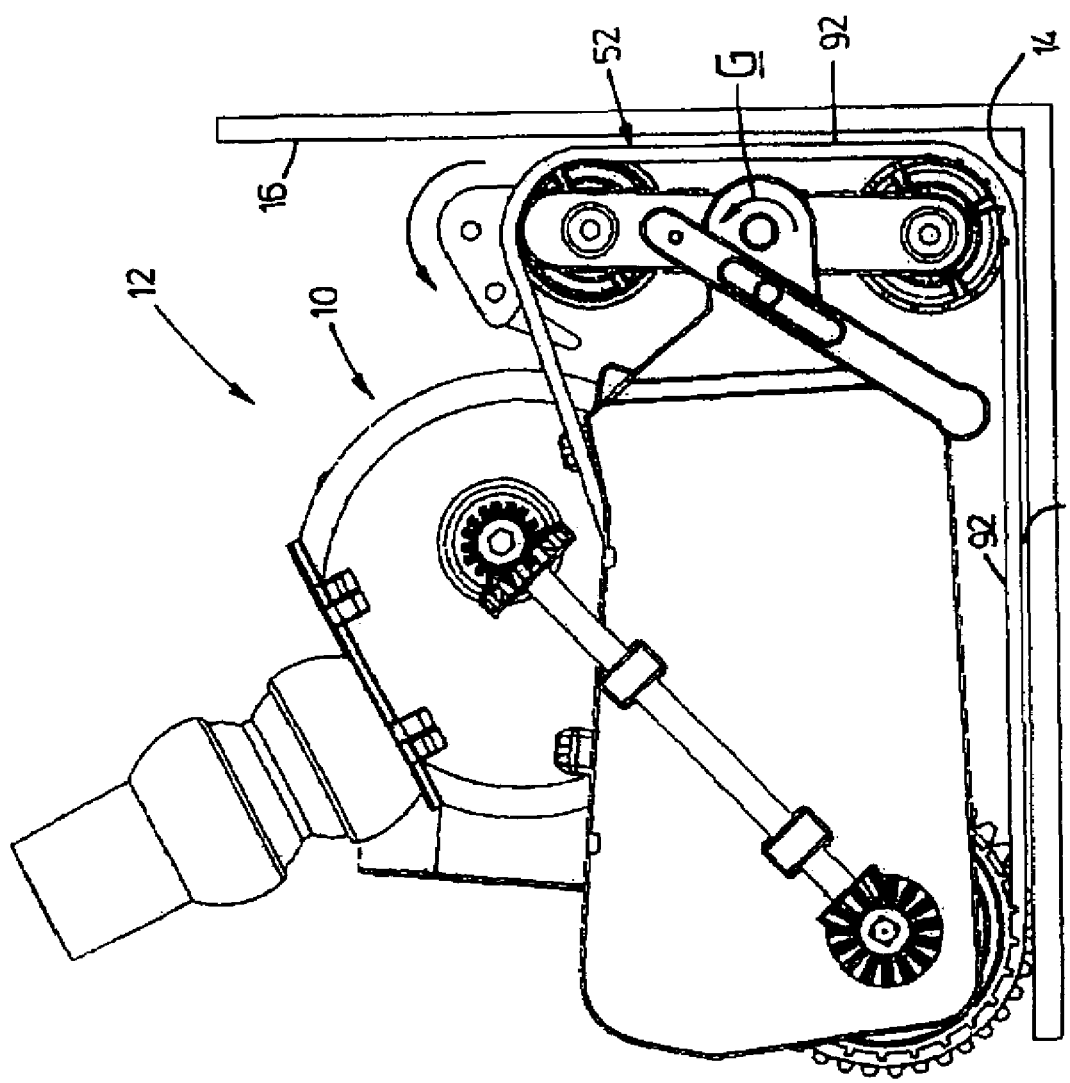
FIG. 15 is a view similar to FIG. 14 with the cleaner negotiating the corner region.

The cleaner 10 comprises a wheeled undercarriage 42 for the body 18, best shown in FIG. 4. The undercarriage 42 comprises first, second and third parallel wheeled axles 44, 46 and 48. The first axle 44 is journaled to the body 18 as shown in FIGS. 1 and 2. The first axle 44 and second axle 46 provide a first section 50 (shown in FIG. 14) of the undercarriage. The second axle 46 and third axle 48 provide a second or front section 52 of the undercarriage and are mounted on an assembly 54 which is pivotable relative to a front end of the body, as shown in FIGS. 11 to 16. As shown in FIGS. 14 and 15 with the first section 50 negotiating a surface 14, the second section 52 is pivotable in elevation (a) relative to the first section. The advantages and use of the pivotable section 52 will be described hereinafter.

As shown in FIGS. 1, 2, 4 and 11 to 16, the pivotable assembly 54 comprises opposed arms 80 and 82 which are pivoted at 84 and 86 to respective forwardly directed extension formations 88 and 90 from body 18. Axles 46 and 48 are journaled between the arms 80 and 82. A brake 81 comprising an elongate member 83 is pivotably mounted at 85 on arm 80. A guide 87 fast with formation 88 extends through an elongate slot 89 defined in the member 83. At its distal end, the brake comprises a formation 91 for engaging a surface of the pool as will hereinafter be described.

Figure 5:
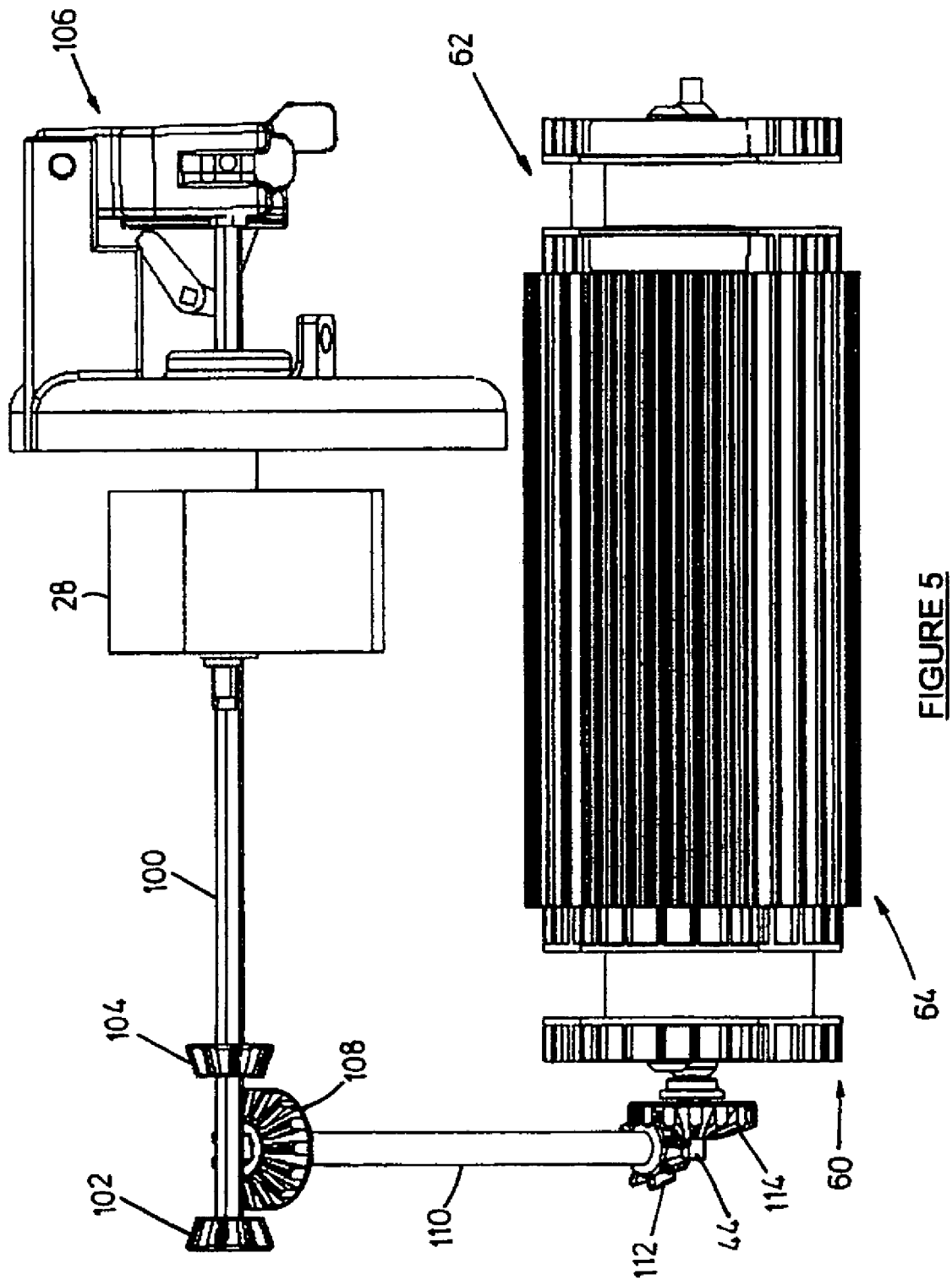
FIG. 5 is a diagrammatic representation of part of a drive mechanism including a rear driven axle of the cleaner.

As shown in FIGS. 4 and 5, on axle 44 there are provided a first toothed wheel 60 and an opposed second toothed wheel 62. A first roller 64 is mounted to extend coaxially between the wheels. On the second axle 46 there are provided a first toothed wheel 66 and a second spaced wheel 68. A second roller 70 is mounted to extend coaxially between the first wheel 66 and second wheel 68. On the third axle 48 there are provided a first wheel 72 and spaced second toothed wheel 74. A third roller 76 extends between the first wheel 72 and second wheel 74.

Figure 3:
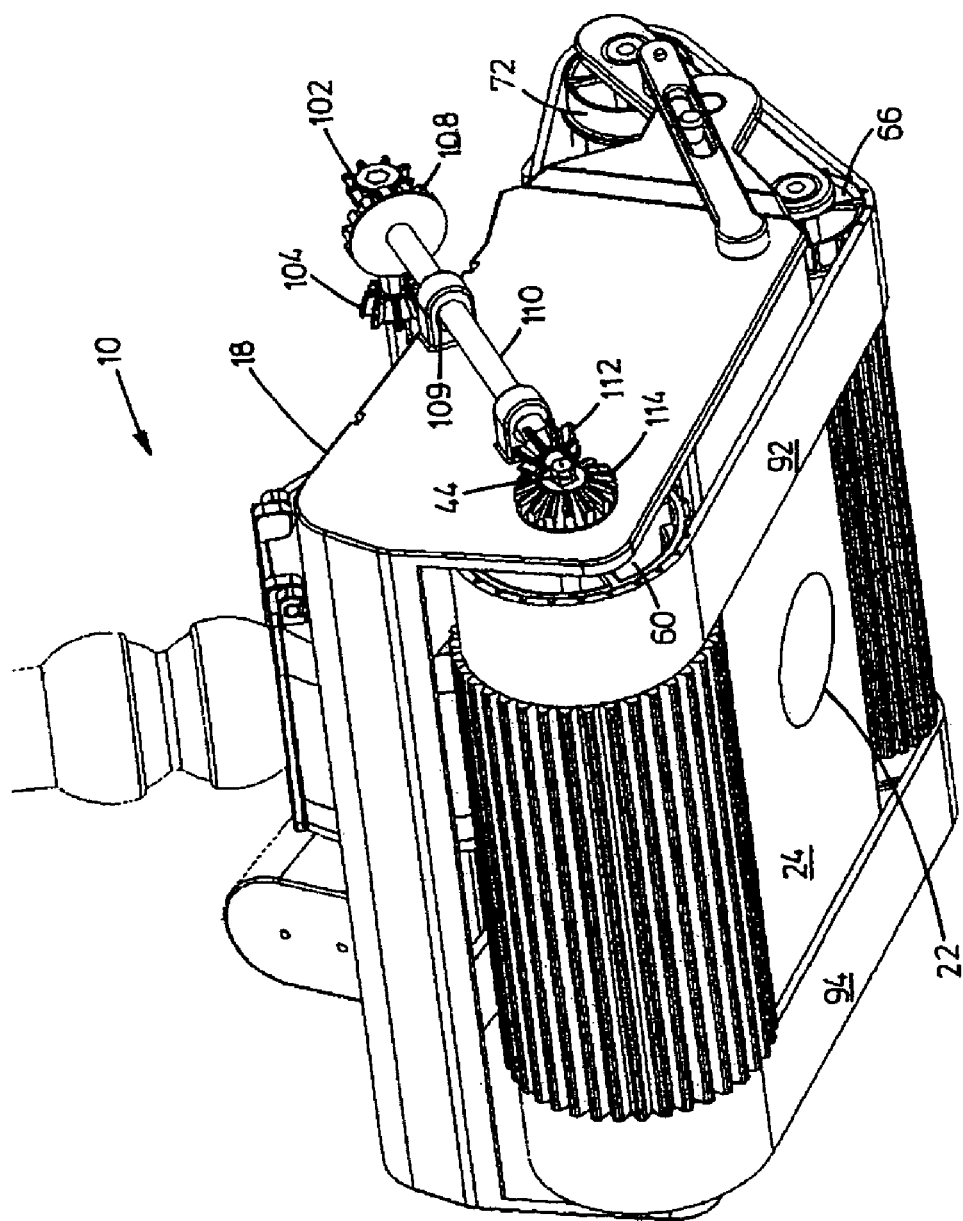
FIG. 3 is a similar view of the cleaner from the rear, the other side and below.

As shown in FIGS. 2 and 3, a first endless track 92 extends about the first wheels 60, 66 and 72 on the axles 44, 46 and 48 and a transversely spaced second endless track 94 extends about the second wheels 62, 68 and 74 on the aforementioned axles. On inside surfaces of the tracks, there are provided formations 96 for cooperating with teeth 98 on the toothed wheels.

As best shown in FIGS. 2, 4, 5, 6 and 7 turbine 28 drives a hexagonal shaft 100 of stainless steel. A first bevel gear 102 is fast at an end of shaft 100 with its bevel facing the shaft. A second bevel gear 104 is also fast with the shaft, but spaced from the first gear and with its bevel facing towards the first gear. The shaft 100 is programmably moveable in an axial direction by a toggle mechanism 106 (shown in FIG. 2) relative to the turbine 28 between a first or normal position (shown in FIG. 3) wherein the first gear 102 engages a beveled driven gear 108 and a second position (shown in FIGS. 1 and 2) wherein the second bevel gear 104 engages the driven gear 108.

Gear 108 is fast with rotary drive shaft 110 journaled by bearings 109 on the body 18 and having a further bevel gear 112 fast at an opposite end thereof. The further bevel gear 112 meshes with a cooperating bevel gear 114 which is fast with hexagonal first axle 44.

Figure 6:
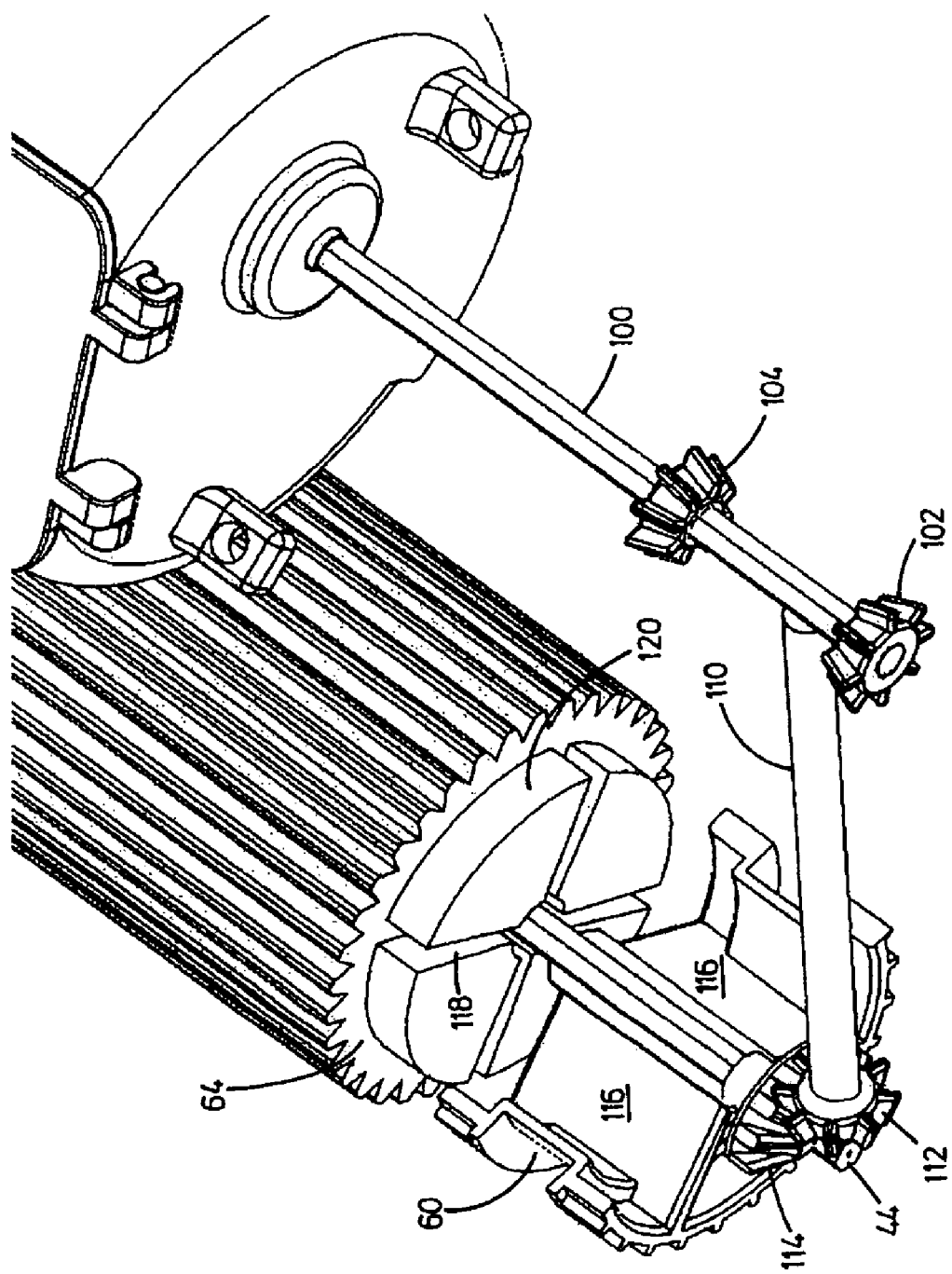
FIG. 6 is a more detailed diagrammatic representation of the part of the mechanism driving the rear axle.

As shown in FIG. 6, first wheel 60 which is fast with axle 44 comprises a plurality of radially extending spokes 116. The spokes 116 engage with cooperating slots 118 defined in cheek or end plate 120 which is fast with first roller 64. The second wheel 62 on the first axle 44 is similarly fast with axle 44 and a second cheek or end plate on the first roller adjacent the second wheel. The roller 70 is similarly fast with its adjacent wheels and axle. Roller 76 is similarly fast with the axle 48 and second wheel 74. The rollers are hollow and may house floats to provide suitable buoyancy in different parts of the cleaner.

Figure 7:
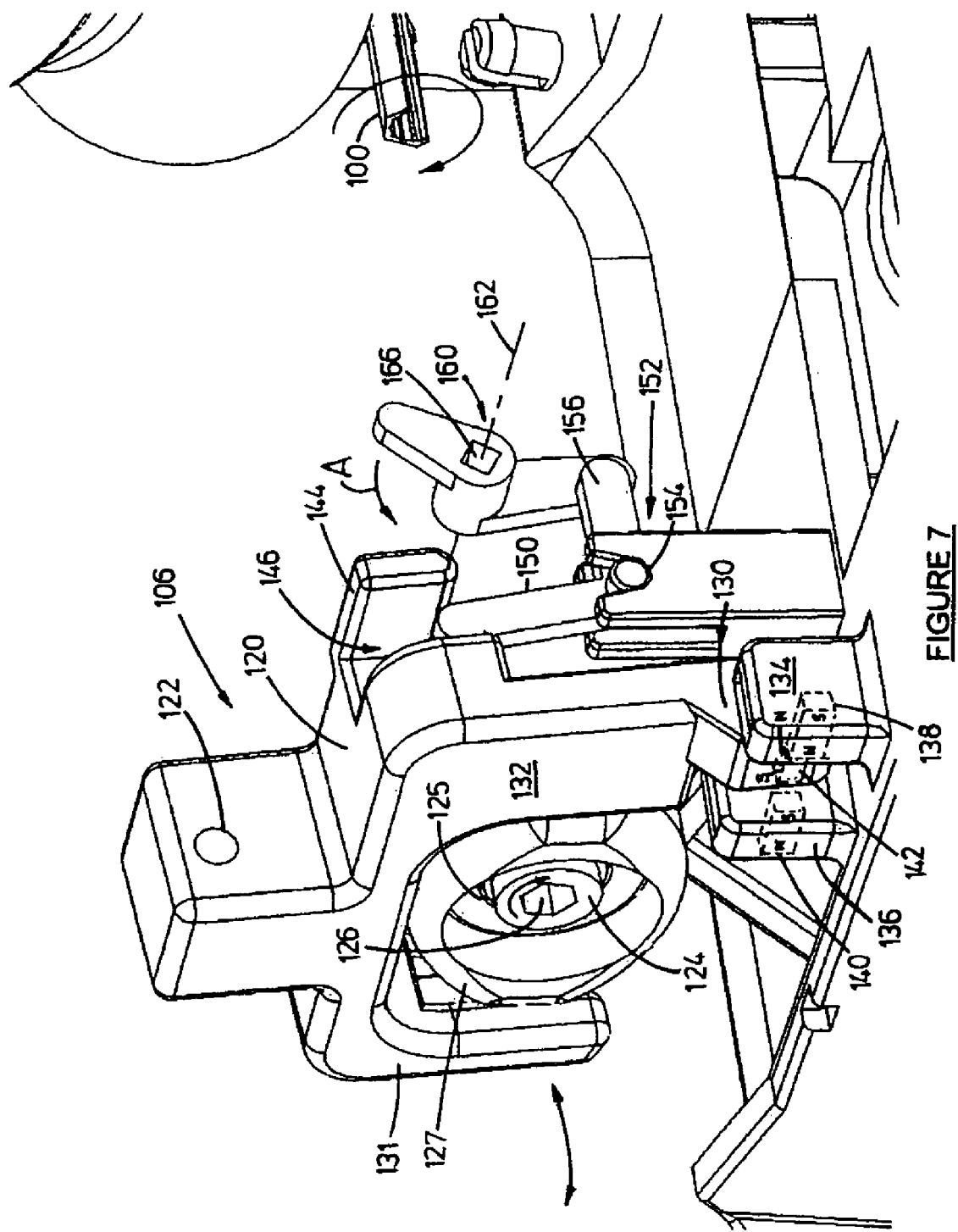
FIG. 7 is a diagrammatic three-dimensional view of a toggle mechanism of a gear change mechanism for the cleaner to cause the cleaner to change between motion in a first direction and motion in a reverse direction.

Referring now to FIGS. 1, 2, 7 to 10, the toggle mechanism 106 comprises a generally inverted y-shaped member 120 pivoted to the body 18 at 122. The turbine driven shaft 100 is fast with a bush 124 defining a socket 126 through which the shaft 100 extends. As best shown in FIG. 7, the bush 124 is mounted in a bearing 125 allowing rotation of the bush and shaft 100. The bearing 125 in turn is mounted in a bearing holder 127 which is pivotable between legs 131 and 132 of member 120 and also slidable in a direction X as shown in FIG. 2 by opposed stubs 135 on the holder which extend into opposed slots 133 defined in the legs 131 and 132.

As shown in FIG. 7, a foot part 130 of one leg 132 of the member 120 extends to a region between two spaced housings 134 and 136 on the body 18. In the housings 134 and 136 there are mounted magnets 138 and 140 respectively. A first pole of magnet 138 faces the foot and an opposite pole of magnet 140 also faces the foot. In the foot 130 there is also mounted a magnet 142 with its first pole facing a similar or like pole of magnet 138 and its opposite pole facing a similar pole of magnet 140.

Figure 8:
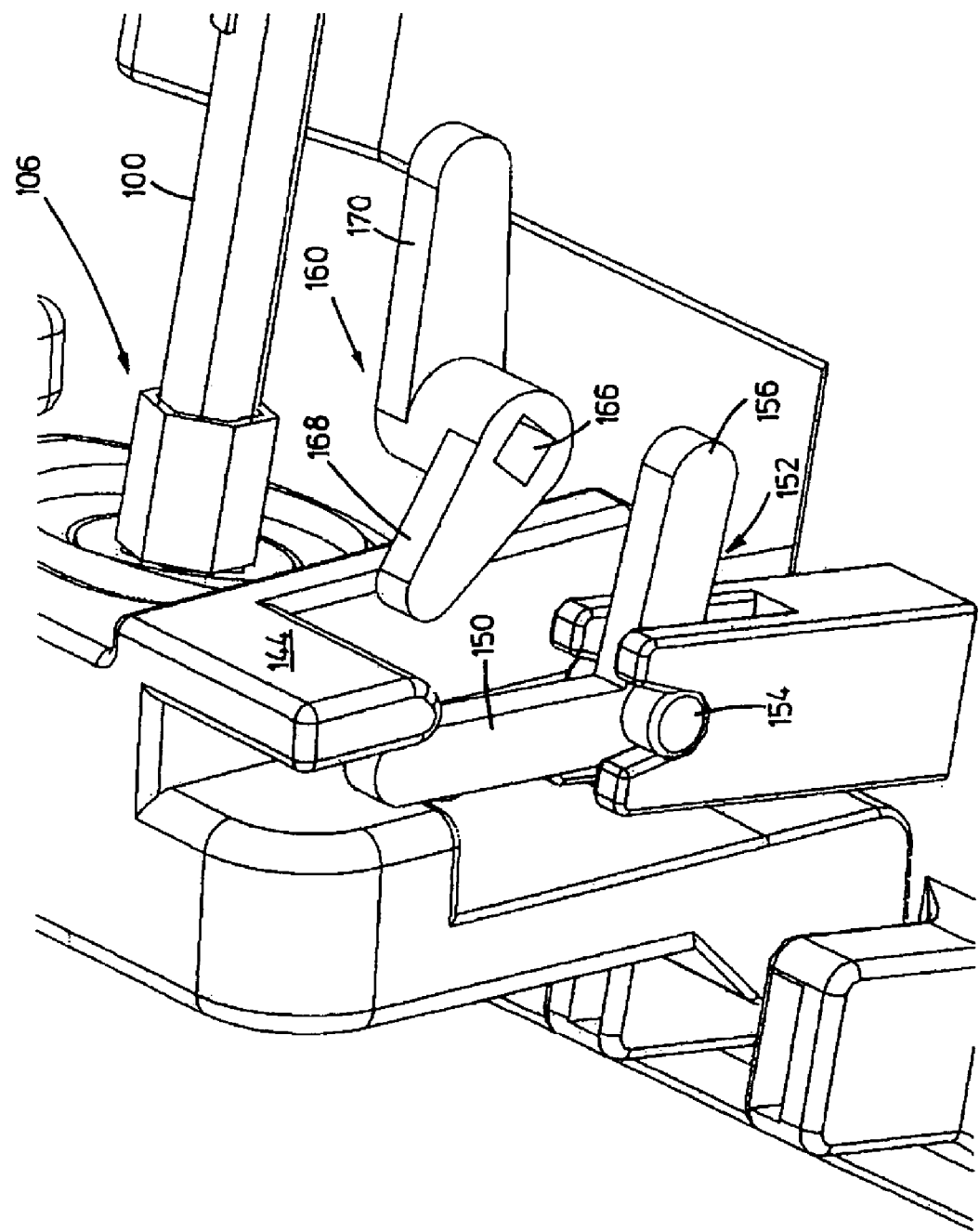
FIG. 8 is a diagrammatic three-dimensional view of a cam arrangement for operating the toggle mechanism.

The pivotal member 120 comprises an integral stub 144 defining a slot 146 between the stub 144 and an upper region of leg 132. A first lobe 150 of a passive cam 152 pivotably mounted on the body 18 at 154 extends into the slot 146. A second lobe 156 of the cam 152 cooperates with a driven cam 160. The driven cam 160 is mounted on the body 18 for rotation in an anti-clock wise direction A (shown in FIG. 7) about an axis 162. The cam may be driven by the turbine 28 alternatively and in a preferred embodiment the cam 160 is driven by a further turbine and reduction gear train housed in a box 164 shown in FIGS. 1 and 17. The further turbine is driven by water flowing through inlet 165 into the box and into the passage way 20 to the suction pump. The gear train linked with the further turbine drives square shaft 166 on which the cam 160 is mounted. As shown in FIG. 8, the cam 160 comprises a first short lobe 168 cooperating with lobe 156 of passive cam 152 and a second longer lobe 170 cooperating with stub 144 in use.

It will be appreciated that with the like poles of magnets 138, 140 and 142 repelling one another, the pivotable member 120 has two stable positions. The first is an extended position shown in FIGS. 9 and 3 wherein bevel gear 102 meshes with driven gear 108. With this arrangement the turbine drives the cleaner in a forward direction B, shown in FIG. 4. The second is a retracted position shown in FIGS. 1, 2, 7, 8 and 10 wherein the second bevel gear 104 meshes with driven gear 108. With this arrangement the turbine drives the axle 44 and cleaner in an opposite or reverse direction C, shown in FIG. 4.

Figure 9:
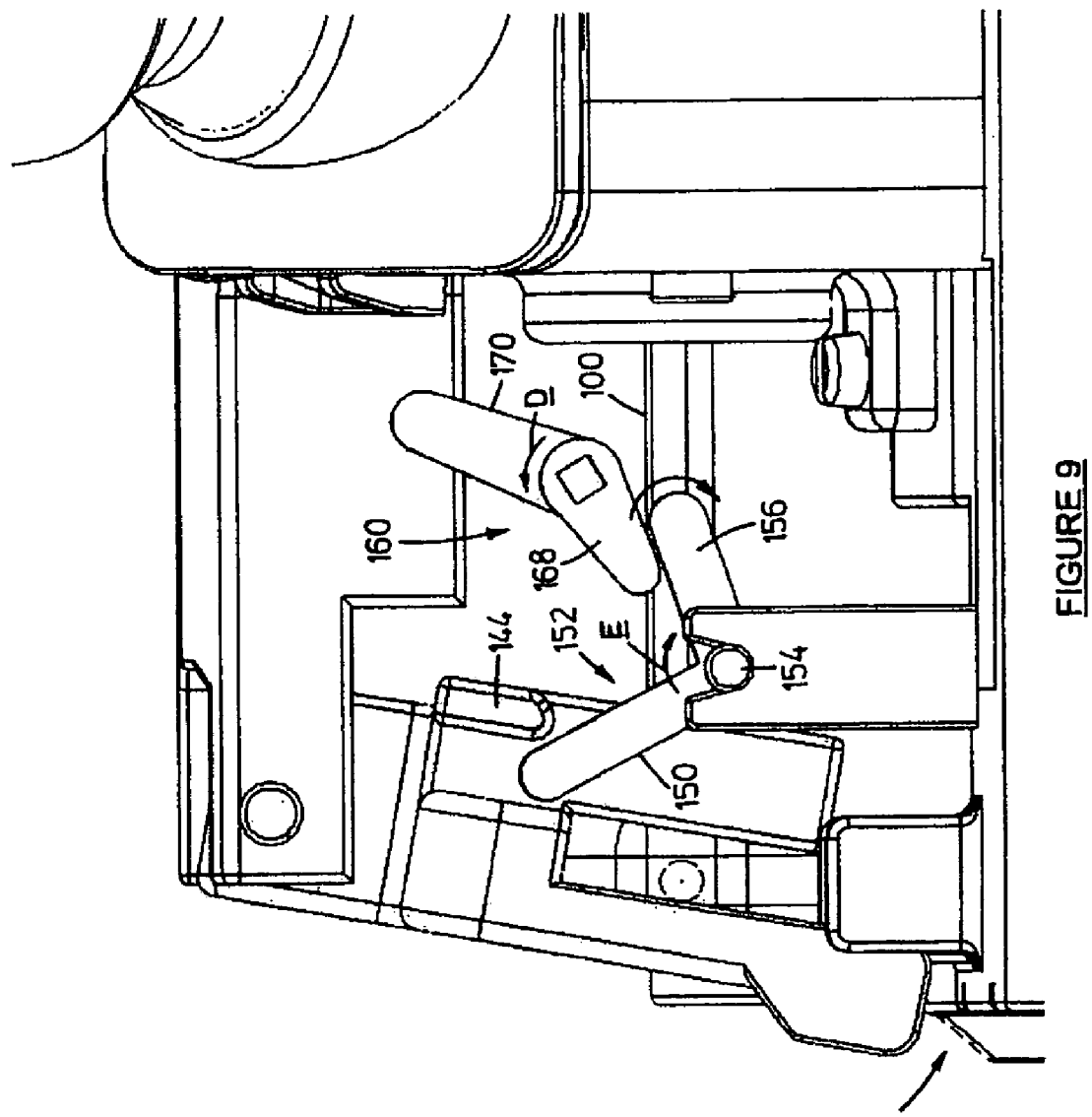
FIG. 9 is a side view of the cam and toggle mechanisms with the toggle mechanism in a first position and about to be operated by the cam arrangement to move towards a second position.

Referring to FIG. 9, with the first bevel gear 102 engaging drive gear 108 and the pivotal member 120 in the extended position, shorter lobe 168 of cam 160 rotating in an anti-clockwise direction D engages second lobe 156 of passive cam 152. The passive cam is urged in a clockwise direction E as shown in FIG. 9. The longer lobe 150 of the passive cam engages stub 144 and urges the pivotal member 120 to pivot in an anti-clockwise direction. The lobe 168 engages the lobe 156 until after a critical point when the repelling forces of the magnets cause foot 130 and the member 120 to accelerate towards the second position shown in FIG. 10 wherein the shaft is moved axially so that the second bevel gear 104 engages the driven gear 108 quickly and cleanly. As stated hereinbefore, the turbine 28 now drives the axle 44 in the reverse direction.

Figure 10:
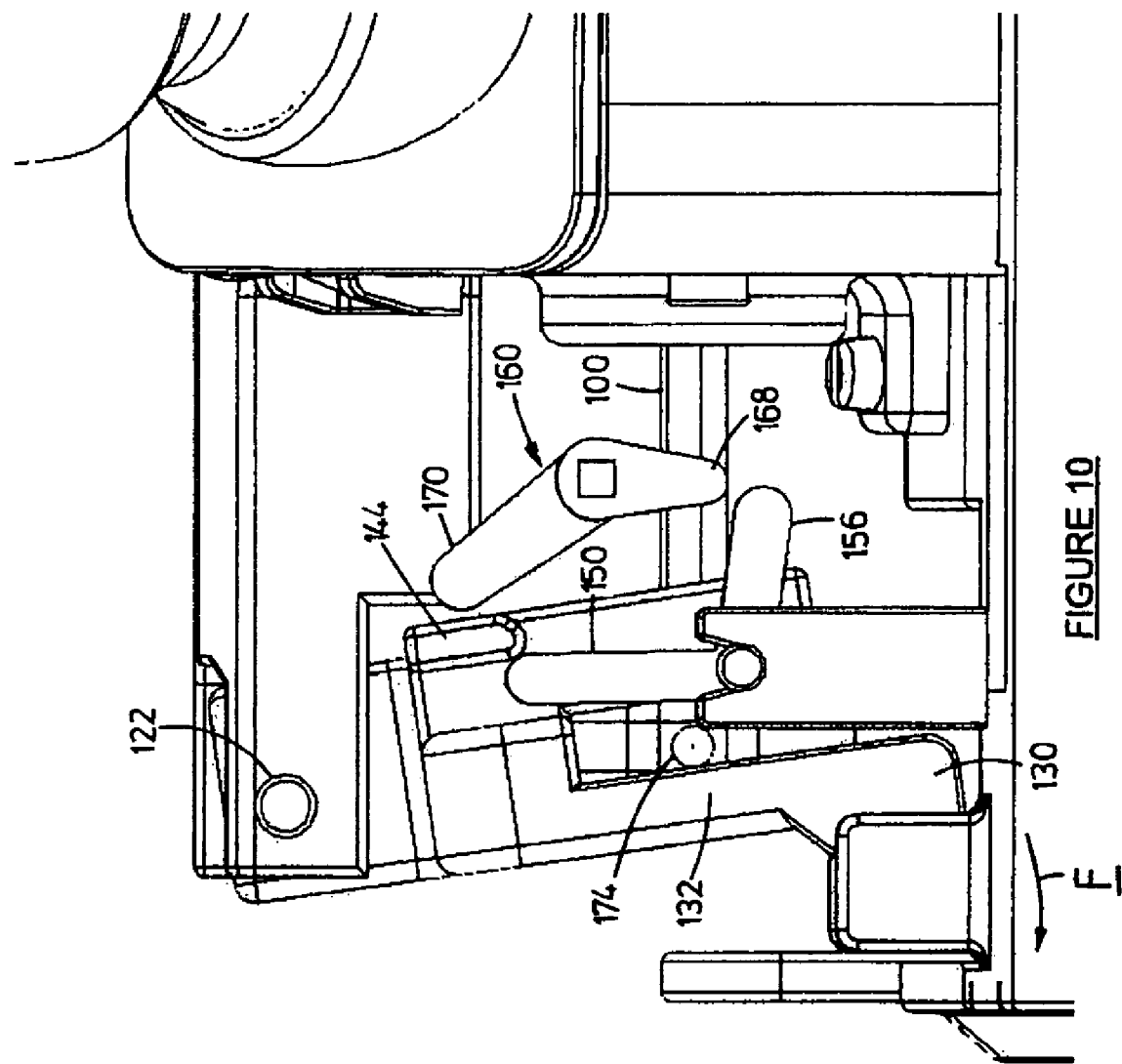
FIG. 10 is a view similar to FIG. 9, but with the toggle mechanism in the second position and about to be operated by the cam arrangement to move towards the first position.

As shown in FIG. 10, the rotating cam 160 continues until the longer lobe 170 engages stub 144. This lobe urges the stub 144 and the member 120 to pivot in a clockwise direction F until beyond a critical point wherein the repelling forces of the magnets again cause the member to move quickly into the first or extended position shown in FIG. 9 and wherein first bevel gear 102 again quickly and cleanly engages the driven gear 108.

The time periods during which the cleaner will move in the forward direction B and in the reverse direction C are programmable by suitable adjustment of the relative configuration of the lobes 168 and 170 of the rotating cam 160. It is believed that the sharp action caused by the repelling forces of the magnets will cause the relevant gear 102 and 104 smoothly and cleanly to engage the driven gear 108.

In other embodiments, the magnets may be replaced by suitable alternative biasing mechanisms or arrangements, such as arrangements comprising springs.

Figure 11:
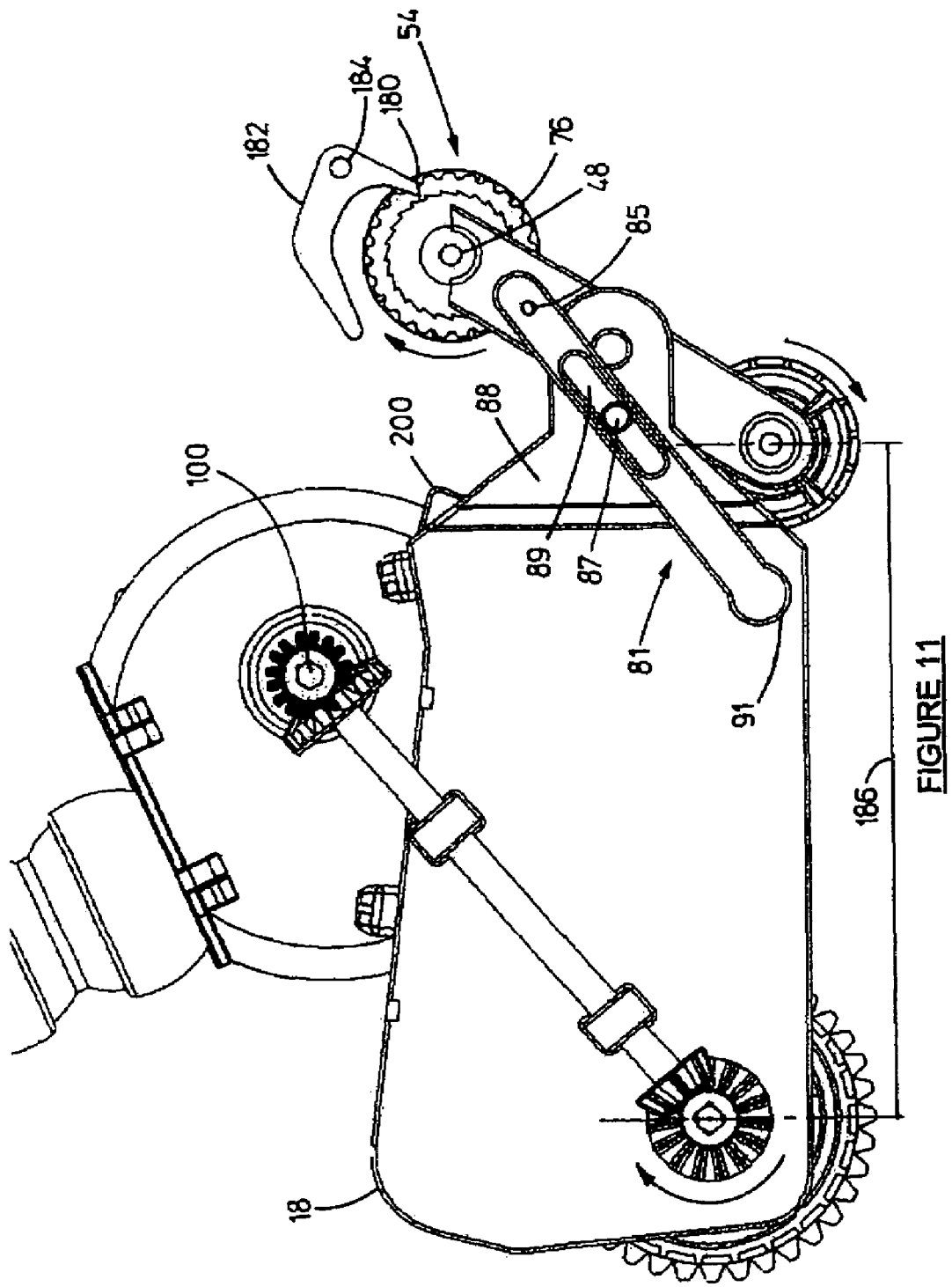
FIG. 11 is a diagrammatic side view of the cleaner from said other side and illustrating a pivotal section of a wheeled undercarriage of the cleaner in a normal position, but not showing endless tracks forming part of the undercarriage.

As best shown in FIGS. 1 and 11 to 13 there is provided a ratchet wheel 180 on the third axle 48 between the first wheel 72 and third roller 76. A pawl 182 cooperating with the ratchet wheel is pivotably anchored at 184 on body 18. While the axle 44 moves in the clock-wise direction as shown in FIG. 11, the pawl simply slips over teeth on the ratchet wheel. However, when the axle 44 starts to move in the reverse direction to cause the cleaner to move in direction C, the pawl 182 engages the wheel 180, thereby to stop rotation of the third axle 48.

Figure 12:
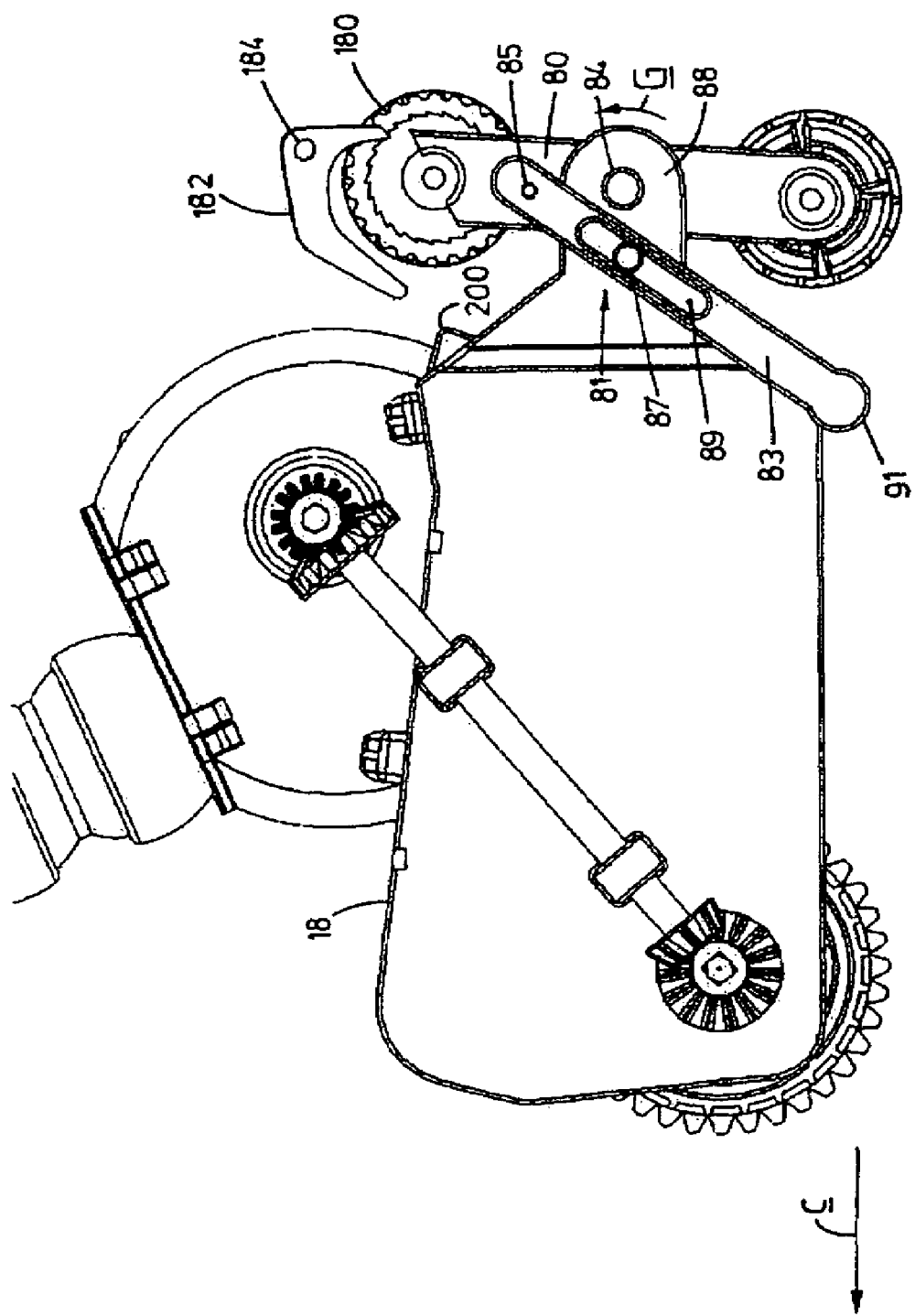
FIG. 12 is a view similar to FIG. 11 with the pivotal section moving towards a second position.

The opposed tracks 92 and 94 driven by the rear axle 44 now cause the second section 52 of the undercarriage to pivot in an anti-clockwise direction G as shown in FIGS. 12 though 13. At the same time brake 81 is pivoted in the same direction and formation 91 engages the surface 14 as shown in FIG. 13. This causes the one side of the cleaner to move faster around brake 81 and the cleaner to change direction. Pawl 182 is released when it engages the formation 200 on the body 18, so that the cleaner is free to move in a reverse direction. The pivoting of section 52 during reversal of the machine automatically changes a relatively short wheelbase 186 (shown in FIG. 11) of first section 50 of the undercarriage during normal forward movement into a relatively longer wheelbase 188 (shown in FIG. 13), which improves the cleaner's stability when in reverse.

When the cleaner resumes normal forward motion as hereinbefore described, that is when bevel gear 102 engages driven gear 108, the pivotal section 52 of the undercarriage automatically pivots towards the normal position as shown in FIG. 14 with the shorter wheelbase and wherein the brake 81 is lifted.

In other embodiments, a similar brake (not shown) may be provided in any other suitable position on the machine (for example adjacent each of wheels 60 and 62 at the rear of the machine) and which may intermittently be operated by the turbine 28 or the further turbine via cams or the like, to engage the surface 14, thereby to cause the machine intermittently to change direction. In a case where two brakes are provided as aforesaid, they may be operated alternatively.

Figure 16:
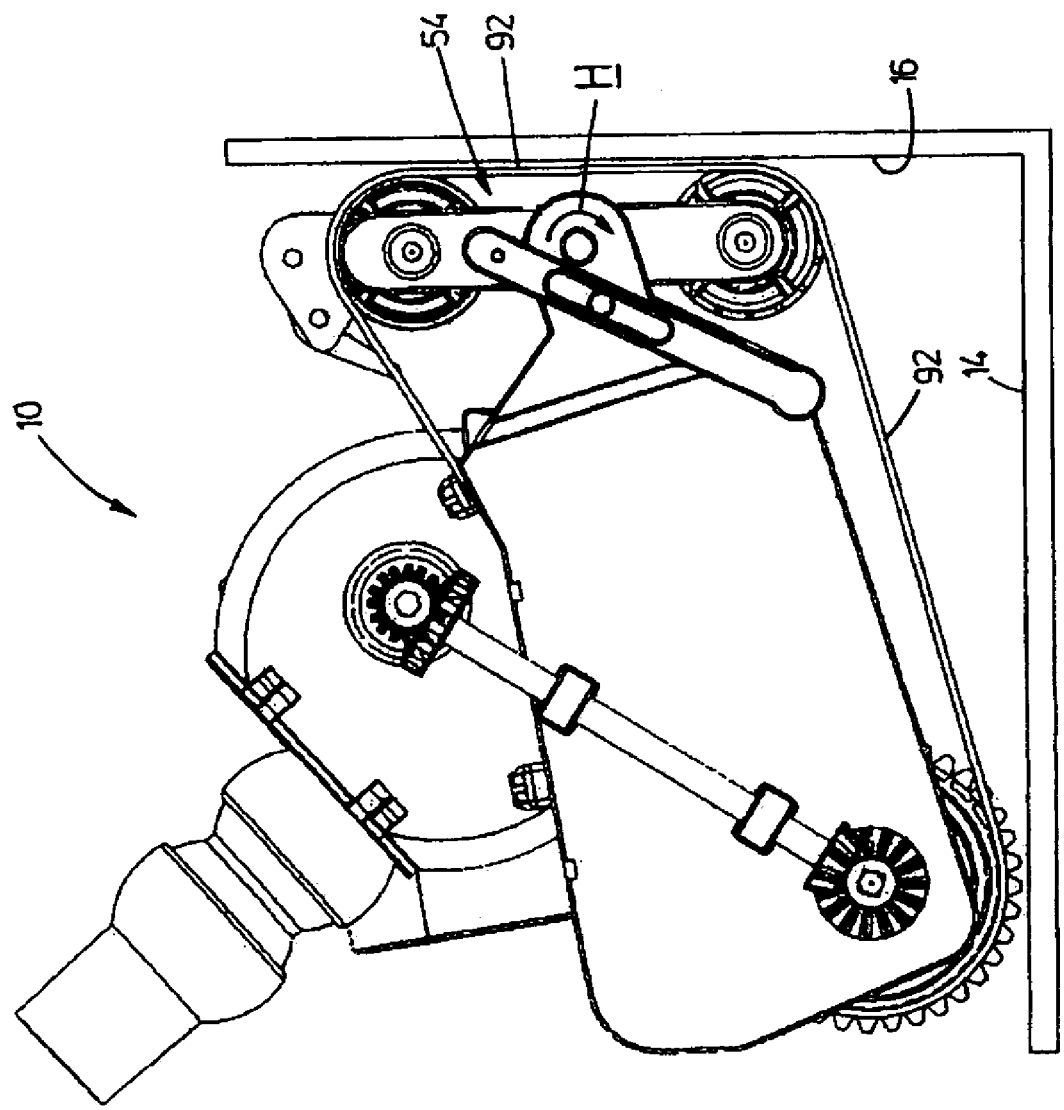
FIG. 16 is another view similar to FIG. 14 with the cleaner starting to scale the side wall.

In FIGS. 14 through to 16 there is illustrated the cleaner 10 negotiating a corner region in the pool 12. In FIG. 14, the pivotable section 52 is in a normal position. As shown in FIG. 15, when the forwardly moving cleaner 10 engages the sidewall 16, the pivotable section 52 pivots in an anti-clockwise direction G better to conform to the profile of the corner region. Substantial parts of tracks 92 and 94 engage both the floor 14 and wall 16 to maintain traction. As shown in FIG. 16, as the cleaner moves closer to and up the wall, the pivotable section progressively pivots in direction H towards the normal position, thereby to maintain sufficient traction and/or suction while the cleaner moves through the corner region. Once on the wall 16, the cleaner continues its movement along the wall in the normal configuration as shown in FIG. 14, although there it is shown in normal configuration on the floor.

An alternative embodiment of the drive mechanism and gear change mechanism is shown in FIGS. 18 to 21. In this embodiment the shaft 100 is square in transverse cross-section and is stationary in an axial direction. A worm gear 202 is fast with shaft 100. A gear 204 cooperates with the worm gear 202 to drive a cam 206 (shown in FIGS. 20 and 21) similar to cam 160. Hence, the further turbine and gear train in box 164 are dispensed with. Shaft 100 is further fast with a drive gear 207. The first axle 44 is driven by a belt and pulley arrangement comprising a pulley 208 fast with axle 44, a belt 210 and a pulley 212. Pulley 212 is fast with a gear 214 of a pivotable assembly 215 also comprising a gear 216 on an extension arm 218.

Figure 18:
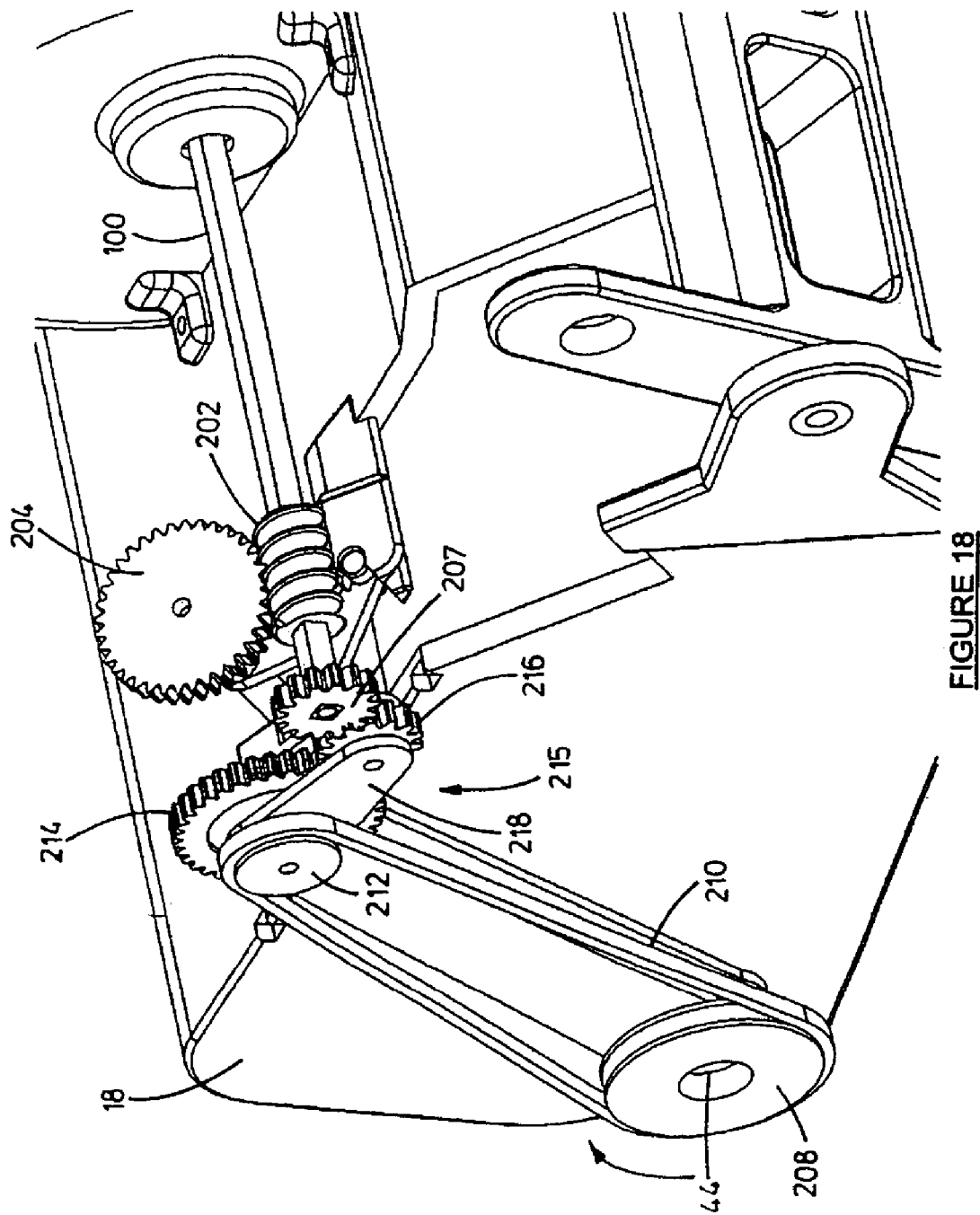
FIG. 18 is a diagrammatic isometric view of a second embodiment of a gear change mechanism for the cleaner with the gears in a configuration to drive the cleaner in a first or forward direction.
Figure 19:
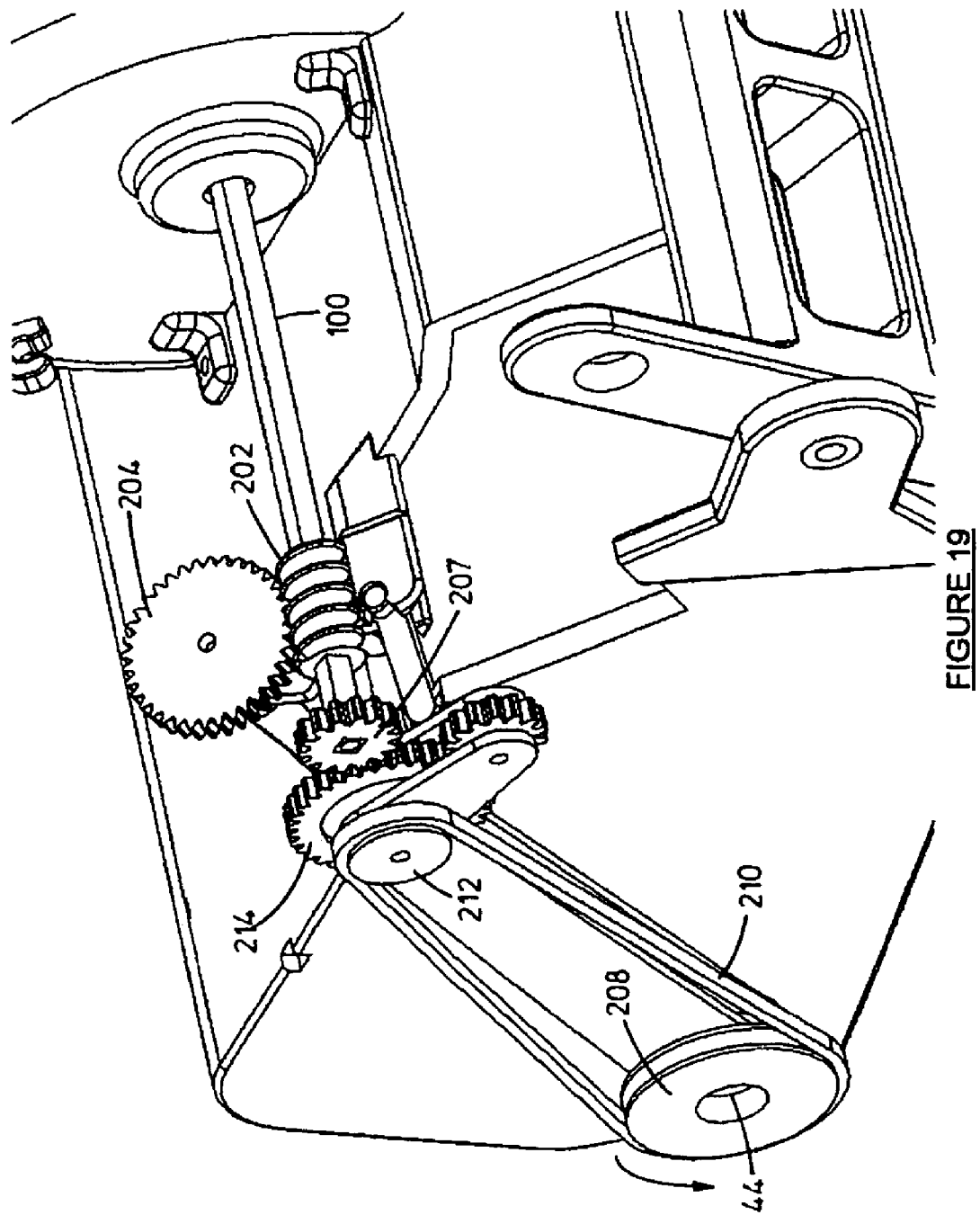
FIG. 19 is a view similar to FIG. 18 with the gears in a configuration to drive the cleaner in a second or reverse direction.

The assembly 215 is pivotable between a first normal position shown in FIG. 18 and a second position shown in FIG. 19. In the first position, the drive gear 207 drives gear 216 which in turn drives gear 214. Gear 214 drives the belt and pulley arrangement, so that the cleaner moves in a forward direction. In the second position shown in FIG. 19, the drive gear 207 drives gear 214 directly, so that the direction of rotation of axle 44 is reversed.

Figure 20:
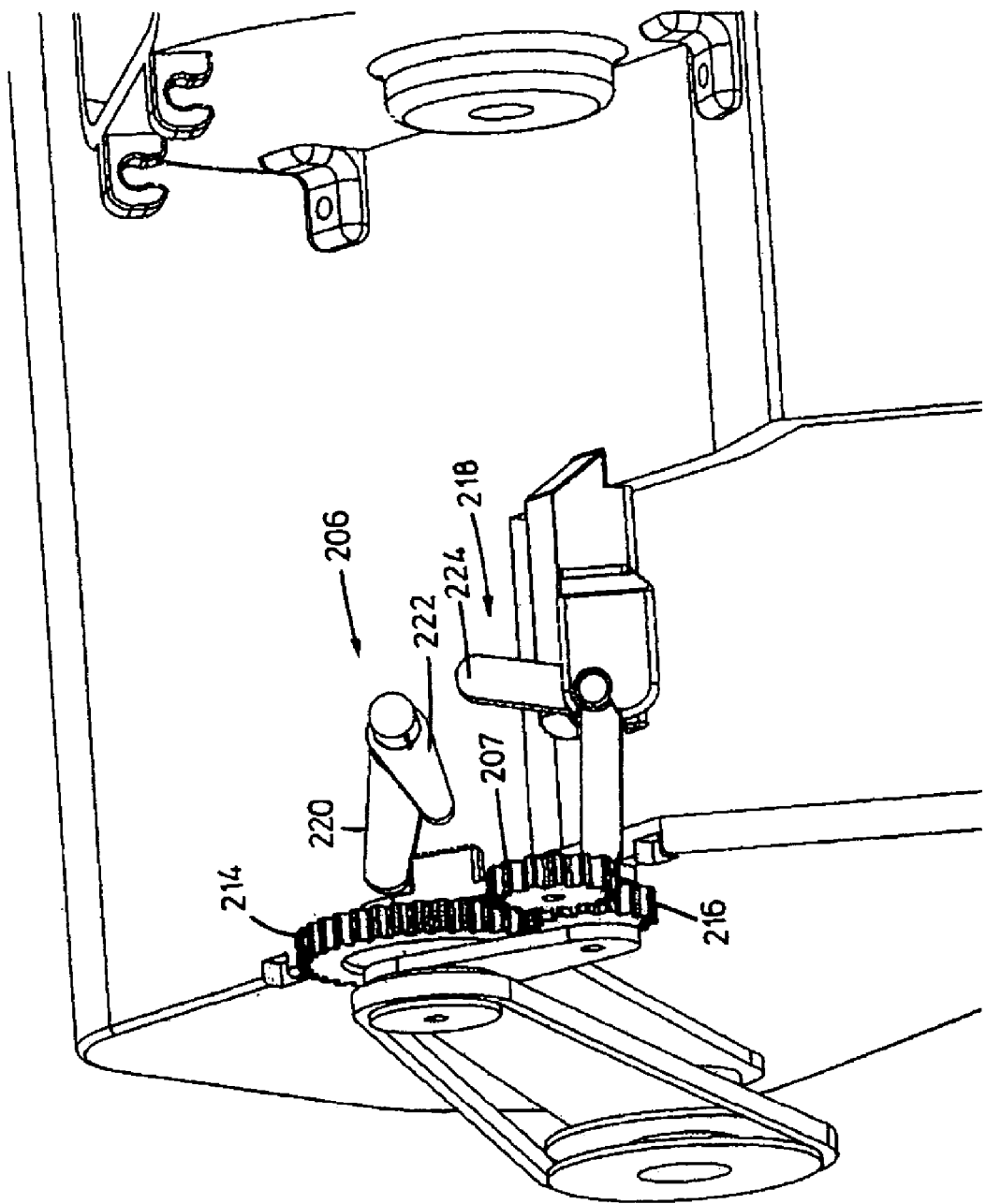
FIG. 20 is a diagrammatic three dimensional view of a cam arrangement forming part of the gear change mechanism about to move the mechanism into the configuration shown in FIG. 19.
Figure 21:
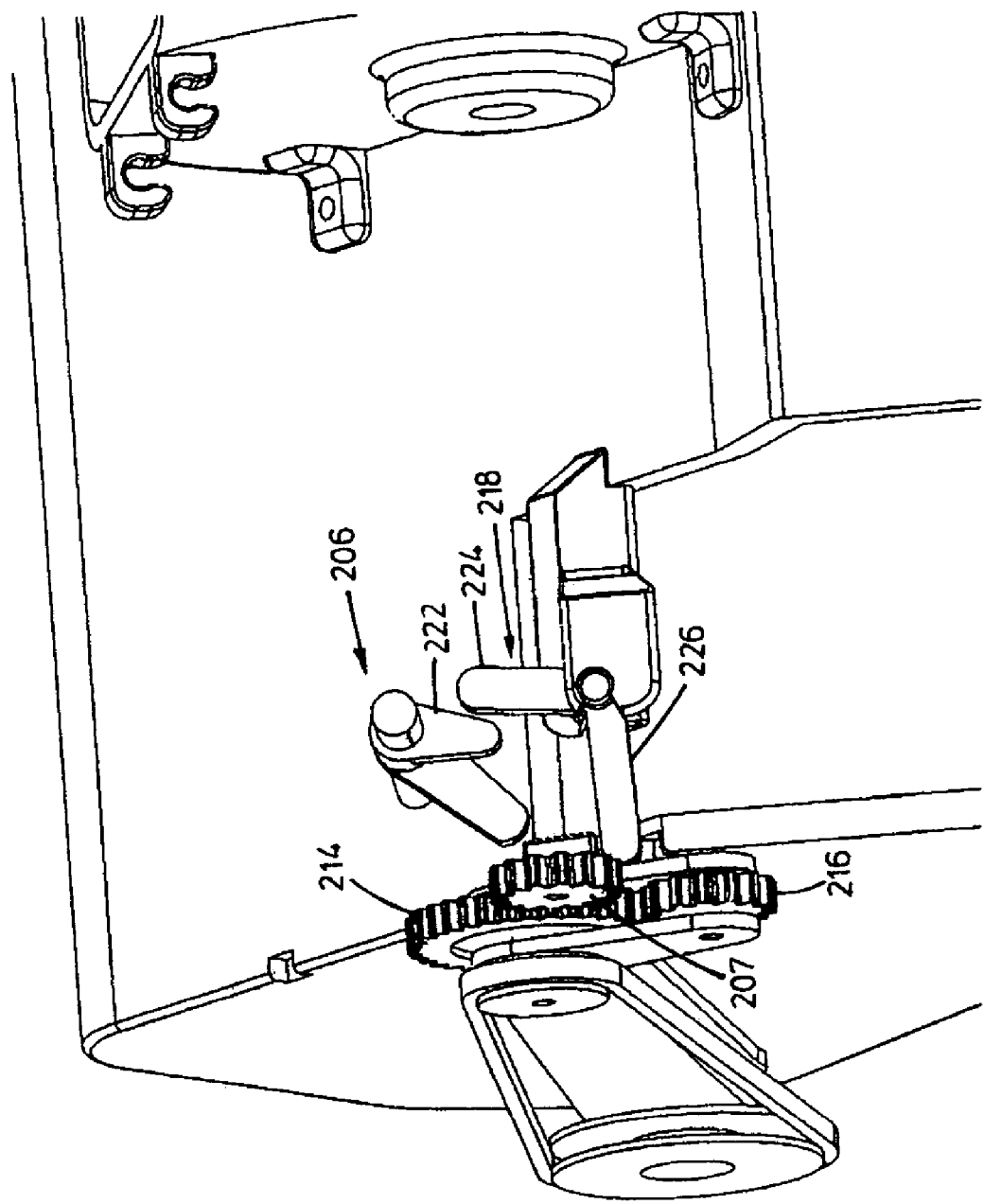
FIG. 21 is a view similar to FIG. 20 with the cam arrangement about to move the gear arrangement into the configuration shown in FIG. 18.

The assembly 215 is pivoted by the cam 206 which is similar to cam 160 hereinbefore described and cam 218 which is similar to cam 152 hereinbefore described. As shown in FIG. 20, lobe 220 of cam 206 urges the assembly in a clock-wise direction to bring gear 214 into direct meshing relationship with drive gear 207 thereby to reverse the direction of rotation of axle 44. As shown in FIG. 21, lobe 222 of cam 206 thereafter cooperates with lobe 224 of cam 218 to cause lobe 226 of cam 218 to pivot the assembly back towards its normal position wherein drive gear 207 meshes with intermediate gear 216 which in turn drives gear 214 as hereinbefore described. The assembly 215 is caused to move quickly to the first and second positions by a suitable toggle mechanism comprising magnets, similar to the mechanism hereinbefore described or other suitable biasing mechanisms.

The invention claimed is:

1. In an automatic pool cleaner comprising a first gear and a second gear, a mechanism for changing between the first gear and the second gear, the mechanism comprising:

an oscillatable gear carrying assembly moveable between a first position wherein the first gear is engaged and a second position wherein the second gear is engaged;

a biasing mechanism for urging the assembly towards a first position when selected and to the second position when selected; and an actuating arrangement for selecting one of said positions by initiating movement of the assembly from another of said positions, to enable the biasing mechanism to urge the assembly towards the selected one of said positions;

the first gear and the second gear being mounted on the assembly and when the first gear is engaged, the cleaner is driven to move in a first direction and when the second gear is engaged, the cleaner is driven in another direction;

the biasing mechanism comprising a first magnet having a pole of a first kind and a pole of a second kind which is carried by the assembly and a second magnet having a pole of the first kind and a pole of the second kind mounted externally of the assembly, with the pole of the first kind of the first magnet facing towards the pole of the first kind of the second magnet, so that mutually repelling forces between said first poles urge the assembly towards the selected one of said positions.

2. A mechanism as claimed in claim 1 wherein the first gear and the second gear when engaged drive a driven gear connected to drive an axle of a wheeled undercarriage of the cleaner.

3. A mechanism as claimed in claim 2 wherein the first gear, the second gear and driven gear are bevel gears.

4. A mechanism as claimed in claim 1 wherein the oscillatable gear carrying assembly comprises a turbine driven shaft of the cleaner.

5. A mechanism as claimed in claim 4 wherein the shaft comprises a formation engaging a corresponding formation on the turbine for rotatably driving the shaft and wherein the shaft is free for axial movement relative to the turbine between a first position wherein the first gear is engaged and a second position wherein the second gear is engaged.

6. A mechanism as claimed in claim 5 wherein the assembly comprises a pivotable member pivoted to a body of the cleaner and for manipulating the shaft between the first position and the second position.

7. A mechanism as claimed in claim 6 wherein the pivotable member cooperates with a bush which is fast with the shaft.

8. A mechanism as claimed in claim 7 wherein the bush is mounted in a bearing for rotation with a first part of the bearing, and wherein a second part of the bearing is mounted on a bearing holder which is pivotably carried by the member.

9. A mechanism as claimed in claim 8 wherein the member is an elongate member and wherein the bearing holder is mounted for axial movement relative to the member.

10. A mechanism as claimed in claim 6 wherein the first magnet is carried in a foot part of the pivotable member, wherein the second magnet is mounted on the body of the cleaner and wherein a third magnet is mounted on the body spaced from the second magnet to define a passage way for the foot part of the pivotable member.

11. A mechanism as claimed in claim 6 wherein the actuating arrangement for initiating movement comprises a first cam cooperating with the pivotable member.

12. A mechanism as claimed in claim 11 wherein the first cam is a turbine driven cam comprising first and second lobes and wherein the arrangement further comprises a passive second cam comprising first and second lobes.

13. A mechanism as claimed in claim 12 wherein the first lobe of the first cam is arranged to engage the member to move the member from the second position and wherein the second lobe is arranged to cooperate with the first lobe of the second cam to cause the second lobe of the second cam to move the pivotable member from the first position.

14. A mechanism as claimed in claim 12 wherein the first cam is driven by a further turbine on the cleaner.

* * * * *